(12) United States Patent
Mizutani et al.

(10) Patent No.: US 8,254,780 B2
(45) Date of Patent: Aug. 28, 2012

(54) PASSIVE OPTICAL NETWORK SYSTEM AND FAULT DETERMINATION METHOD

(75) Inventors: Masahiko Mizutani, Yokohama (JP);
Yusuke Yajima, Fujisawa (JP);
Yoshihiro Ashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 647 days.

(21) Appl. No.: 12/379,634

(22) Filed: Feb. 26, 2009

(65) Prior Publication Data

US 2010/0067901 A1   Mar. 18, 2010

(30) Foreign Application Priority Data

Sep. 12, 2008 (JP) ................................. 2008-234188

(51) Int. Cl.
*H04B 10/00* (2006.01)

(52) U.S. Cl. ................. 398/24; 398/17; 398/22; 398/72

(58) Field of Classification Search .............. 398/66–72, 398/17–24

See application file for complete search history.

(56) References Cited

U.S. PATENT DOCUMENTS

| | | | | |
|---|---|---|---|---|
| 5,008,877 A * | 4/1991 | Levinson | ........................ | 398/60 |
| 6,115,163 A * | 9/2000 | Nobuhara | ...................... | 398/210 |
| 6,592,272 B1 * | 7/2003 | Masucci et al. | ................... | 398/47 |
| 6,650,839 B1 * | 11/2003 | Mallard et al. | ..................... | 398/9 |
| 6,744,987 B1 * | 6/2004 | Boytim et al. | ................... | 398/98 |
| 7,646,990 B2 * | 1/2010 | Weber et al. | ................... | 398/197 |
| 7,680,414 B2 * | 3/2010 | Kazawa et al. | ................. | 398/67 |
| 7,751,712 B2 * | 7/2010 | Zhao et al. | ........................ | 398/72 |
| 7,881,607 B2 * | 2/2011 | DeLew et al. | ................... | 398/17 |
| 7,925,164 B2 * | 4/2011 | Sitton et al. | ..................... | 398/72 |
| 7,957,647 B2 * | 6/2011 | Kazawa et al. | ................. | 398/75 |
| 2007/0116466 A1 * | 5/2007 | Gewirtzman et al. | ........... | 398/71 |
| 2007/0140689 A1 | 6/2007 | Haran | | |

(Continued)

FOREIGN PATENT DOCUMENTS

WO   WO 2007/123692   11/2007

OTHER PUBLICATIONS

Gigabit-capable Passive Optical Networks (GPON): General Characteristics, ITU-T G.984.1 (Mar. 2003).

(Continued)

*Primary Examiner* — Agustin Bello
(74) *Attorney, Agent, or Firm* — Antonelli, Terry, Stout & Kraus, LLP.

(57) ABSTRACT

In a passive optical network system, a parent station includes a reception circuit that receives an optical signal from each of child stations using a threshold used to identify if the optical signal is 0 or 1; a bandwidth setting unit that determines a time at which each child station sends an optical signal; a storage unit that stores thresholds and intensities of optical signals received from the child stations; and a control unit that sets a threshold, stored corresponding to a sending time, in the reception circuit to control a reception of an optical signal. The control unit has a function that compares an intensity of a signal received from each child station at an optical signal reception time with information stored in the storage unit to detect and determine a fault in the child station or in the optical fiber connected to the child station.

3 Claims, 17 Drawing Sheets

U.S. PATENT DOCUMENTS

| | | | |
|---|---|---|---|
| 2007/0147836 A1* | 6/2007 | Dong | 398/71 |
| 2007/0147837 A1* | 6/2007 | Yoo et al. | 398/72 |
| 2007/0237523 A1* | 10/2007 | Miguel et al. | 398/71 |
| 2007/0292132 A1* | 12/2007 | Zhao et al. | 398/63 |
| 2008/0044177 A1 | 2/2008 | Huang et al. | |
| 2008/0181603 A1* | 7/2008 | Liu et al. | 398/25 |
| 2008/0187312 A1* | 8/2008 | Kazawa et al. | 398/63 |
| 2010/0067901 A1* | 3/2010 | Mizutani et al. | 398/20 |

OTHER PUBLICATIONS

Gigabit-capable Passive Optical Networks (GPON): Physical Media Dependent (PMD) Layer Specification, ITU-T, G.984.2 (Mar. 2003).
Gigabit-capable Passive Optical Networks (GPON): Transmission Convergence Layer Specification, ITU-T, G.984.3 (Feb. 2004).

* cited by examiner

FIG.6

| DBA TABLE | | | | UPLINK RECEIVED LIGHT MONITOR INFORMATION | | |
|---|---|---|---|---|---|---|
| Alloc-ID 1211 | SENDING START POSITION (TIME/NUMBER OF BYTES) 1212 | SENDING END POSITION/ TOTAL NUMBER OF BYTES SENT 1213 | FLAG 1214 | ONU-ID 1221 | RECEIVED POWER (DB) 1222 | FLAG 1223 |
| 1 | S_start1 | B1 | | 1 | x | |
| 2 | S_start2 | B2 | | 1 | y | |
| ...... | | | | | | |
| N | S_startN | BN | | m | z | |

PASSIVE OPTICAL NETWORK SYSTEM AND FAULT DETERMINATION METHOD

INCORPORATION BY REFERENCE

The present application claims priority from Japanese application JP2008-234188 filed on Sep. 12, 2008, the content of which is hereby incorporated by reference into this application.

BACKGROUND OF THE INVENTION

The present invention relates to the configuration of a passive optical network system in which multiple optical network units share an optical transmission line and a method for determining a fault occurred in the system.

Recently, FTTH (Fiber To The Home), which is an optical fiber service on access lines that serve subscribers, is introduced, and the communication services provided via this optical access network become more and more diversified as the transmission capacity grows.

An optical communication network called a Passive Optical Network (hereinafter referred to as a PON) has been widely used as an optical access network. This is because the PON system allows multiple users to share an optical fiber, the optical line terminator installed in a station receives communications from multiple users in the multiplexed mode, and the communication with each user's optical network unit can be managed integrally. Those features reduce the facility cost and the maintenance management cost of the optical access network.

Standardization work has been carried out as more and more PON systems are introduced, and GPON (Gigabit capable PON), which is standardized by International Telecommunication Union Telecommunication Standardization Sector (ITU-T), is widely used today as a standard PON (see Non-Patent Documents 1-3). This GPON, which uses 125-μsecond-period frames for data transmission control, can carry out variable-bandwidth, best-effort type communications such as constant-rate, constant-period information delivery via an E1 line or T1 line that has been used for conventional leased-line services or Ethernet (registered trademark: applicable also to the rest of this specification) that has been used for data communications. In addition to GPON, GEPON that supports best-effort type communications specifically designed for the Ethernet protocol is introduced and, to meet a future bandwidth demand, standardization work is underway for a PON that handles high-speed signals with the rate of 10 Gbits/second.

In a PON system, multiple Optical Network Units (hereinafter referred to as ONUs) installed in user sites and an Optical Line Terminator (hereinafter referred to as an OLT) installed in a communication carrier station are connected via optical fibers. A splitter is provided on the optical fiber that connects the ONUs and the OLT. Each ONU is connected to the splitter via a branch optical fiber, and the splitter is connected to the OLT via a trunk optical fiber. In the typical configuration of a PON system, the wavelength of an optical signal used for downlink communication and the wavelength of an optical signal used for uplink communication are different to avoid collision between the uplink communication and the downlink communication on the same optical fiber. The downlink signal from the OLT to an ONU is transferred in the PON section (the part including an optical fiber between the OLT and an ONU is sometimes called PON in the description below) as a form of a frame composed of a header and a payload, and the ONU references the header information to capture the necessary information. The uplink signals from all ONUs to the OLT are optical signals of the same wavelength, with a transmission time slot allocated to each ONU for time-division transmission to the OLT. The uplink signals sent from the ONUs via the branch optical fibers are once time-division multiplexed by the splitter onto the trunk optical fiber and are sent to the OLT.

Today, the PON system service is provided by distributing ONUs from a communication carrier to subscribers. In future, it is expected that a user will purchase an ONU and connect it to an optical connection outlet or an optical connection terminal device installed in the user's home. For example, a device in which a set-top box for receiving a TV broadcast via an optical network and an ONU are integrated will be sold at an ordinary electric store and a user who wants to subscribe to the PON system will purchase this device and connect the device to the carrier-provided OLT for using the PON system. In a case in which the user purchases an ONU as described above, a part of the optical section is released to the user, meaning that, depending upon the quality of an ONU provided by a third party other than a carrier and/or upon the user's usage method, there is a possibility that it will be difficult for the communication carrier to manage the ONUs or the whole PON system.

Optical line systems are standardized by documents, such as ITU-T Recommendation G984.1, ITU-T Recommendation G984.2, and ITU-T Recommendation G984.3.

SUMMARY OF THE INVENTION

One of the cases where the management becomes difficult as described above is a case where a communication error occurs. For example, when the optical signal sending module of an ONU fails or a continuous signal is intentionally entered into an optical fiber by a third party for disrupting the service, it is considered that an optical signal is input from a particular ONU at a time not expected by the OLT. The basic configuration of a PON system currently in operation is that the carrier responsible for the operation of the whole PON system keeps track of all ONUs below the OLT and controls and manages the communication with the ONUs. More specifically, the current PON system has the ONU management function via the OMCI (ONU Management and Control Interface) and the communication timing (time slot for each subscriber) control function for the PON section via the DBA (Dynamic Bandwidth Assignment), and each ONU is assumed to operate in response to an instruction from the OLT. Thus, neither the technology for processing the communication error described above is closely studied nor is the detailed configuration or procedure defined for determining the ONU or for allowing the OLT to control the ONU when a device error occurs in an ONU.

Failure to control an ONU in which an error has occurred sometimes results in a situation in which the ONU continuously emits light and, in the worst case, interferes the communication between other ONUs and the OLT. At this time, because all ONUs use the common wavelength for the uplink signal, the currently available OLT in a station cannot determine which ONU is emitting light. Of course, the cause of the communication error can be determined and a corrective action can be taken by visiting the sites where the PON system is installed and sequentially changing the ONU or by disconnecting the optical signal of branch optical fibers. However, the procedure for visiting the sites for diagnosing all ONUs and branch optical fibers is time consuming and expensive. To avoid this problem, the OLT installed in a carrier for managing the PON system is required to have a function and a method that allow the OLT to quickly determine communication errors occurred in the PON system even if the situation described above occurs. More specifically, there is a need for a PON system, an OLT, or its operation method (fault determination method) that allows the OLT in the PON system to quickly determine a communication error occurred in a particular ONU or a branch optical fiber and to take action (corrective action).

To solve the above problems, a passive optical network system of the present invention, in which a parent station and a plurality of child stations are connected via an optical fiber network comprising an optical splitter and a plurality of optical fibers, comprises a reception circuit that receives an optical signal from each of the plurality of child stations using a threshold used to identify if the optical signal is 0 or 1; a bandwidth setting unit that determines a time at which each of the plurality of child stations sends an optical signal; a storage unit that stores the thresholds and intensities of optical signals received from the plurality of child stations; and a control unit that sets a threshold, stored corresponding to the time, in the reception circuit to control a reception of an optical signal, and further comprises a function that compares an intensity of a signal received from each of the plurality of child stations at an optical signal reception time with information stored in the storage unit to detect and determine a fault in the child station or in the optical fiber connected to the child station.

The parent station measures and stores a second intensity of an optical signal received at a time other than the optical signal reception time and controls the reception circuit using a first intensity of an optical signal received and stored when each of the plurality of child stations is in a normal state, the second intensity, and the threshold in order to detect and determine a fault in the child station or in the optical fiber connected to the child station.

The actual configuration of a passive optical network system, in which a parent station and a plurality of child stations are connected via an optical fiber network comprising an optical splitter and a plurality of optical fibers, and a fault detection and determination method are as follow.

The parent station comprises a reception circuit that receives an optical signal from each of the plurality of child stations using a threshold used to identify if the optical signal is 0 or 1; a bandwidth setting unit that determines a time at which each of the plurality of child stations sends an optical signal; a storage unit that stores the thresholds and intensities of optical signals received from the plurality of child stations; and a control unit that sets a threshold, stored corresponding to the time, in the reception circuit to control a reception of an optical signal, stores a first intensity of an optical signal received from each of the plurality of child stations when the system is in a normal state, a second intensity of the optical signal received at a time other than the determined time, and thresholds corresponding to the plurality of child stations, and when a fault occurs in a child station or in an optical fiber and the parent station detects an abnormal condition in a reception of optical signals from the plurality of child stations, performs a reception of an optical signal with the threshold, which is set in the reception circuit at a time at which a signal is received from each of the plurality of child stations, changed to a value generated by adding the second intensity to the stored threshold and, if a comparison between the first intensity and the intensity of the received signal indicates a normal reception, judges that the child station whose threshold is changed is normal, and determines a child station in which a fault occurs or the optical fiber connected to the child station by selecting a child station, which is not determined normal as a result of the change in the threshold, from the plurality of child stations.

When a fault occurs in an ONU, the PON system and the operation method of the present invention determine the ONU and disconnect it from the PON system operation to minimize the effect on the communication wither other ONUs. In addition, the PON system and the operation method of the present invention reduce the maintenance time of a maintenance engineer in charge of maintaining the PON system, resulting in a reduction in the system operation cost and an increase in the maintenance efficiency.

When a continuous light is intentionally input to the PON system by a third party with an intention to disrupt the service, the PON system and the operation method of the present invention allow the user to determine the ONU and the light input position quickly and easily and disconnect that part from the OLT, thus increasing the security and reliability of the system operation.

Other objects, features and advantages of the invention will become apparent from the following description of the embodiments of the invention taken in conjunction with the accompanying drawings.

BRIEF DESCRIPTION OF THE DRAWINGS

FIG. 6 is a memory configuration diagram showing an example of the control parameters stored in a PON control unit.

DESCRIPTION OF THE EMBODIMENTS

The configuration and the operation of a PON system according to the present invention will be described in detail with reference to the drawings, using an example of the configuration and the operation of GPON defined by ITU-T Recommendation G984.

Figure 1:
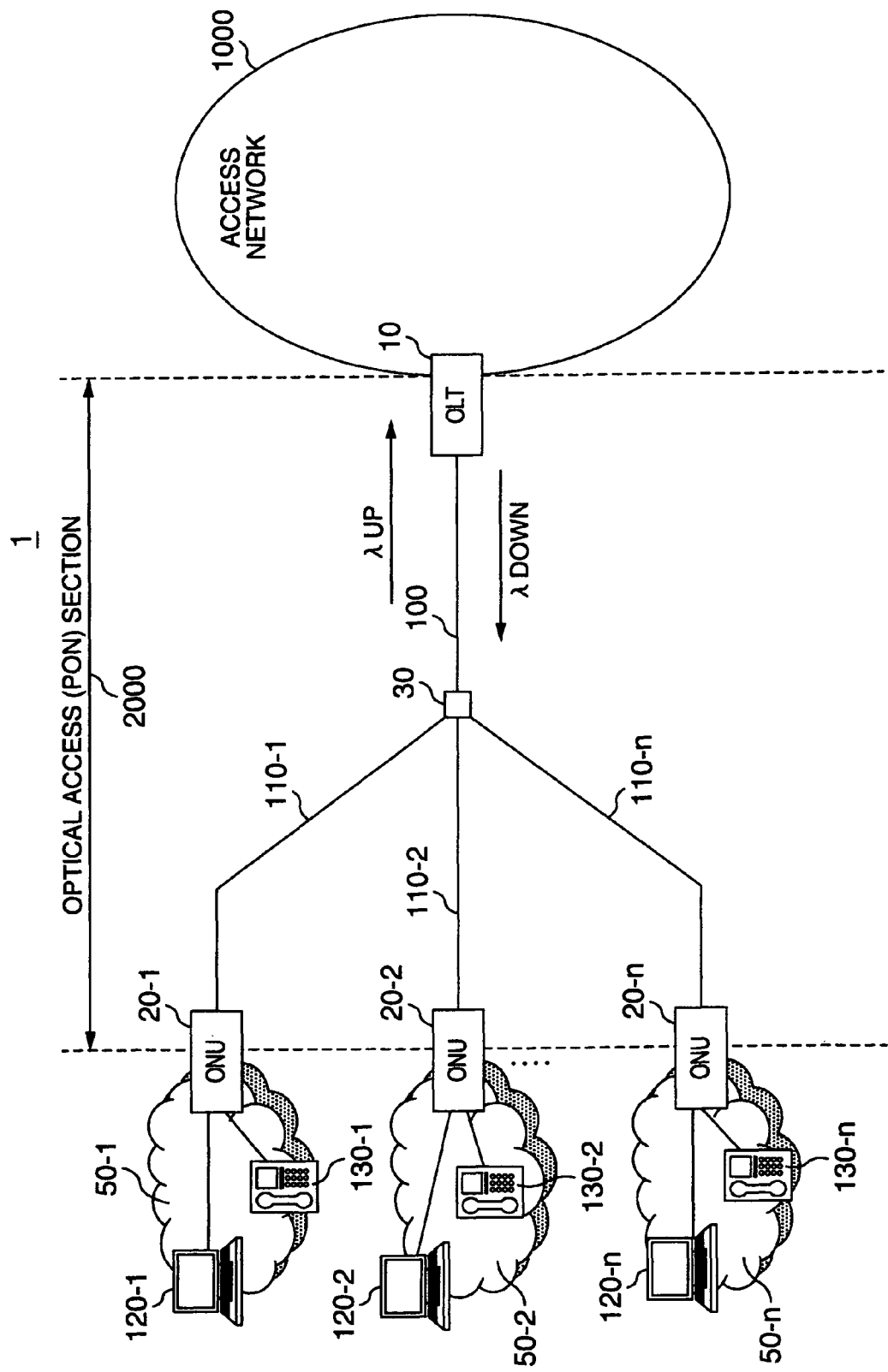
FIG. 1 is a network configuration diagram showing an example of the configuration of an optical access network using a PON system of the present invention.

FIG. 1 is a network configuration diagram showing an example of the configuration of an optical access network using a PON system according to the present invention.

An optical access network 1 comprises a PON section 2000, which comprises an OLT 10, multiple ONUs 20-1-20-$n$, an optical splitter 30, a trunk optical fiber 100, and multiple branch optical fibers 110-1-110-$n$, subscriber networks 50 (or terminals such as a PC 120 and a telephone 130) connected to the ONUs 20, and an access network 1000 that is a higher level communication network.

The OLT 10 is a communication device, which has an interface to both the PON section 2000 and the access network 1000, sends and receives information to and from the higher-level communication network via the access network 1000 and sends and receives the information to and from the ONUs. The access network 1000, though a packet communication network comprising IP routers and Ethernet switches in this example, may be another type of communication network. The ONU 20, installed in user's home or in a company site, is connected generally to the subscriber network 50 such as a LAN whose scale varies according to the installation. To the subscriber networks 50, an IP phone, the phone terminal 130 that provides existing telephone services, and the information terminal 120 such as a PC/mobile terminal are connected.

In the PON section 2000, communication is carried out between the OLT 10 and the ONUs 20-1-20-$n$ via an optical signal. As was described before, the wavelengths of the optical signals used are made different between the uplink $\lambda$up and the downlink $\lambda$down to prevent signal interference in the optical fibers 100 and 110 and the splitter 30.

The downlink signal sent by the OLT 10 is branched by the splitter 30 and sent to all ONUs 20-1-20-$n$ included in the PON system. For example, in GPON, the downlink signal from the OLT 10 is sent using frames (hereinafter called GEM frames) used for communication in the PON section 2000. Each of those GEM frames is composed of a header and a payload, and the header includes the identifier (ONU-ID) of the ONU 20 that is the destination of the GEM frame. Each of the ONUs 20-1-20-$n$ extracts the header of the GEM frame and processes the frame if the destination of the frame indicates the ONU itself, and discards the frame if the destination of the frame indicates one of other ONUs 20.

For the uplink communication from each of the ONUs 20-1-20-$n$, an optical signal of the same wavelength $\lambda$up is used. The signal has the format of a variable length packet (hereinafter called a GEM packet) composed of the header and the payload of each ONU. To prevent the collision of GEM packets from the ONUs 20 on the trunk optical fiber 100, the GEM header includes identification information so that each of the ONUs 20 can be identified and the ONUs 20 output the GEM packets at different times. More specifically, (1) the technology called ranging is used to measure the distance from the OLT 10 to each of the ONUs 20-1-20-$n$ to adjust the delay amount of the signal and (2) the technology called DBA (Dynamic Bandwidth Assignment) is used by the OLT 10 which requests the ONUs 20-1-20-$n$ to declare the waiting data amounts and, based on the declarations, sends the instructions on the uplink signal sending times and the transmittable data amounts of the ONUs 20-1-20-$n$ to them.

Figure 2:
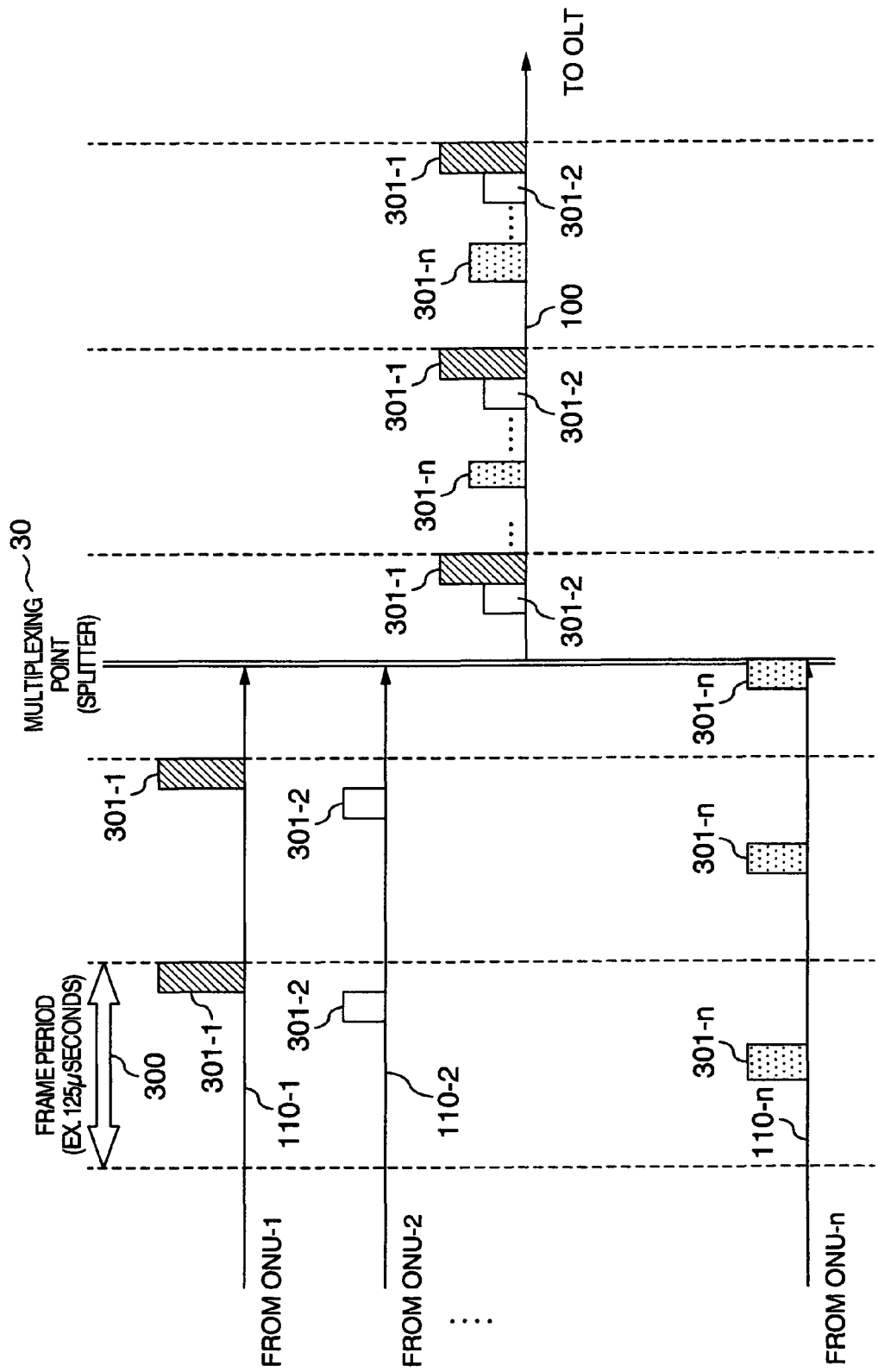
FIG. 2 is a signal configuration diagram showing how uplink signals are time-division multiplexed in the PON system.

FIG. 2 is a signal configuration diagram showing how uplink signals are time-division multiplexed in the PON system.

As described above, the OLT 10 uses the DBA to determine the time at which the signal of the GEM packet 20 is to be sent from each ONU 20 according to a communication bandwidth request (declaration) received from the ONUs 20 connected below the OLT 10 and, based on the determination, each of the ONUs 20-1-20-$n$ sends the uplink signal to the corresponding branch optical fiber, 110-1-110-$n$. The figure shows how the uplink signals from the ONUs 20 to the OLT 10 are sent and multiplexed where the dotted lines indicate the frame period (125 $\mu$-seconds).

GEM packets 301, transferred into optical signals and sent from the ONUs 20-1-20-$n$ via the branch optical fibers 110-1-110-$n$, pass through the splitter 30 and are time-division optically-multiplexed onto one trunk optical fiber 100. In the figure, the numerals 301-1-301-$n$ indicate the sending positions and the sending data sizes of uplink GEM packets sent from the ONUs 20-1-20-$n$. The figure also shows that there is a difference in the intensities of the optical signals received by the OLT 10 from the ONUs 20. The figure shows that the light intensity of the signal received from the ONU 20-1 is strongest, followed by that of the signal from the ONU 20-$n$, followed by that of the signal from the ONU 20-2. The information is time-multiplexed and sent with the relation among the optical signal intensities still maintained on the trunk optical fiber 100 after the optical signals pass through the splitter 30.

Figure 3:
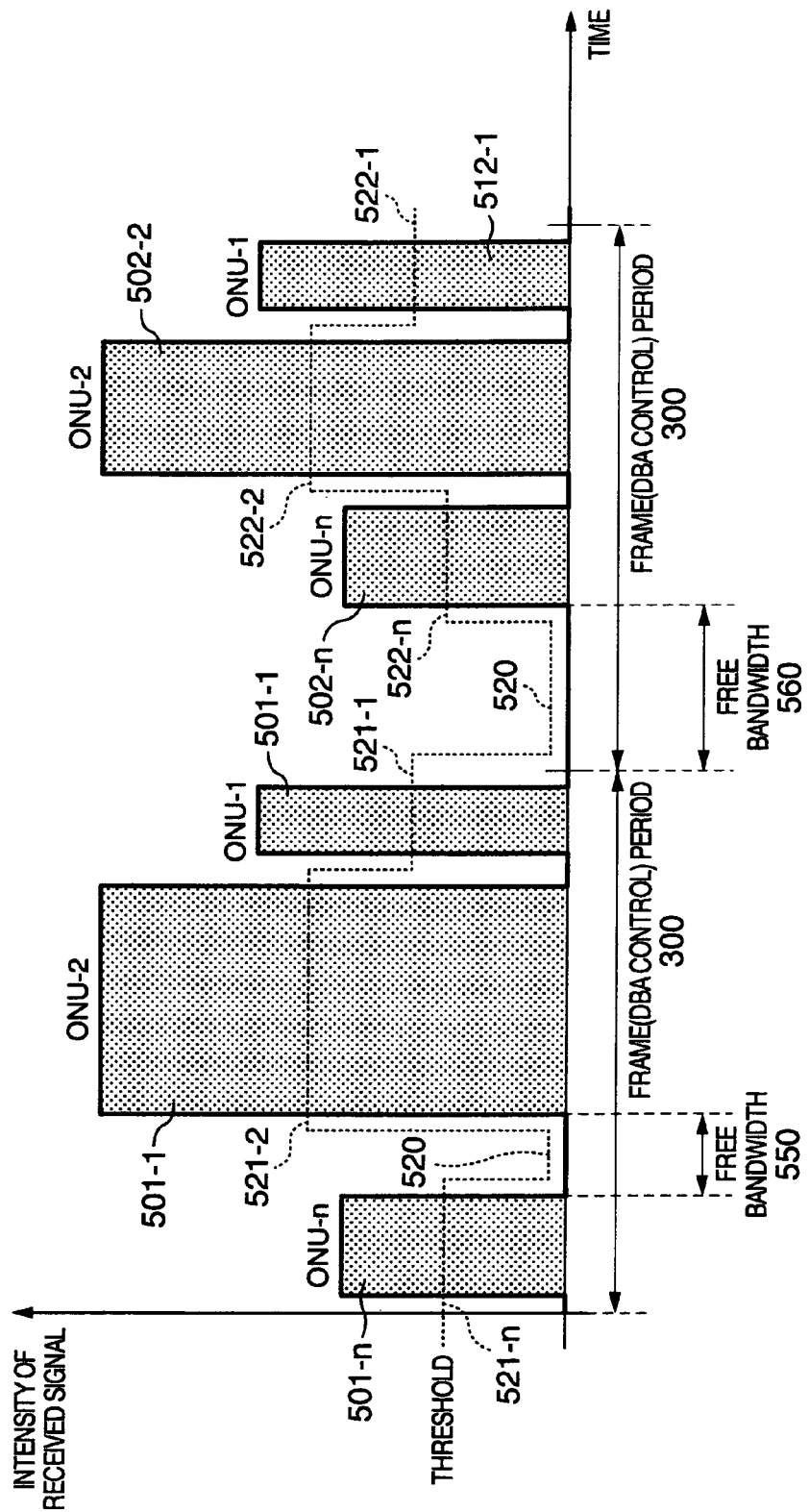
FIG. 3 is a signal configuration diagram (1) showing the uplink signals received by an OLT.

FIG. 3 is a signal configuration diagram showing the uplink signals received by the OLT 10. The figure shows the signal state when all ONUs 20 connected to the OLT 10 are operating normally. The figure shows, in enlarged size, the uplink signals that have passed through the splitter 30 are time-division optically-multiplexed onto the trunk optical fiber 100 (see FIG. 2).

When the OLT 10 sends an instruction to the ONUs 20-1-20-$n$ connected below it at each frame period (sometimes referred to as DBA control period, which is composed of multiple frame periods, in the description below) 300 to indicate that the time has come to send an uplink signal, each ONU 20 sends a GEM packet at the time specified by the instruction. The figure shows how GEM packets 501 and 502, which are sent from the ONU 20-1, ONU 20-2, and ONU 20-$n$, are received by the OLT 10. The numerals 550 and 560 in the figure indicate free bandwidths that indicate a part (no-light part if the operation is normal) where there is no uplink signal sent from the ONUs 20 to the OLT 10 as a result of DBA performed by the OLT 10. In addition, there are no-light parts, similar to parts 550 and 560, at the boundary between the signals from the ONUs 20. Those no-light parts are guard times used by the OLT 10 as the delimiter of GEM packets sent from the ONUs 20. The OLT 10 takes into consideration those guard times when it specifies the GEM packet sending times via DBA.

Because the distance between each ONU 20 and the OLT 10 differs among the ONUs, the intensity of an uplink signal received by the OLT 10 differs among the ONUs 20 as shown in the figure. This means that the OLT 10 must adjust the threshold of a signal for receiving the signal correctly each time the ONU 20, from which an uplink GEM packet is sent, is changed. The numerals 521 and 522 (dotted lines) in the figure indicate the thresholds for identifying the signals, received from the ONUs 20, correctly as one of two values 0 and 1. Those thresholds are changed according to the ONU 20 from which the signal is received. The detail will be described later. In the PON system of the present invention, the OLT 10 memorizes the thresholds, each corresponding to one of the ONUs 20-1-20-$n$, and changes the threshold each time the OLT 10 sends the instruction to correctly identify the signal of the GEM packets from the ONUs 20. The thresholds 521 and 522 are values for correctly receiving an uplink signal when the intensity of the received optical signal exceeds the threshold. The value is 0 if the optical signal intensity does not exceed the setting value, and the value is 1 if the optical signal intensity exceeds the setting value. More specifically, those thresholds are controlled by the ATC (Automatic Threshold Control) function executed at system startup time and are stored in the OLT 10 wherein, when an uplink GEM packet (burst signal) is received, the AGC function uses the preamble part of the signal to find the maximum intensity and the minimum intensity of the received burst signal and sets the threshold to the mean value of the maximum intensity and the minimum intensity. In case when the intensity of a received optical signal is known, it is possible to set the threshold in the OLT 10 in advance.

As described above, the PON system of the present invention has the function that allows the user to easily detect a communication error occurred in the system and, especially, the function to quickly detect a continuous optical signal output from an ONU in which an error occurs and to take a corrective action for it. As will be described more in detail with reference to the drawings, the PON system of the present invention controls the above thresholds as necessary to detect an error. More specifically, during the time no uplink signal is received, the system is basically in the non-light state in which there is no optical signal and, so, a threshold 520 (hereinafter, sometimes referred to as a noise level because this threshold indicates the signal intensity of the non-light (signal) section) in free bandwidths 550 and 560 is set low. That is, an uplink signal with the intensity exceeding the noise level 520, if received by the OLT 10 in the no-light state of the uplink signal, indicates that an error occurs somewhere in the PON system. In this case, the OLT 10 changes the threshold to detect a position (ONU 20 or the branch optical fiber 110) where the intensity of the optical signal is abnormal.

Figure 4:
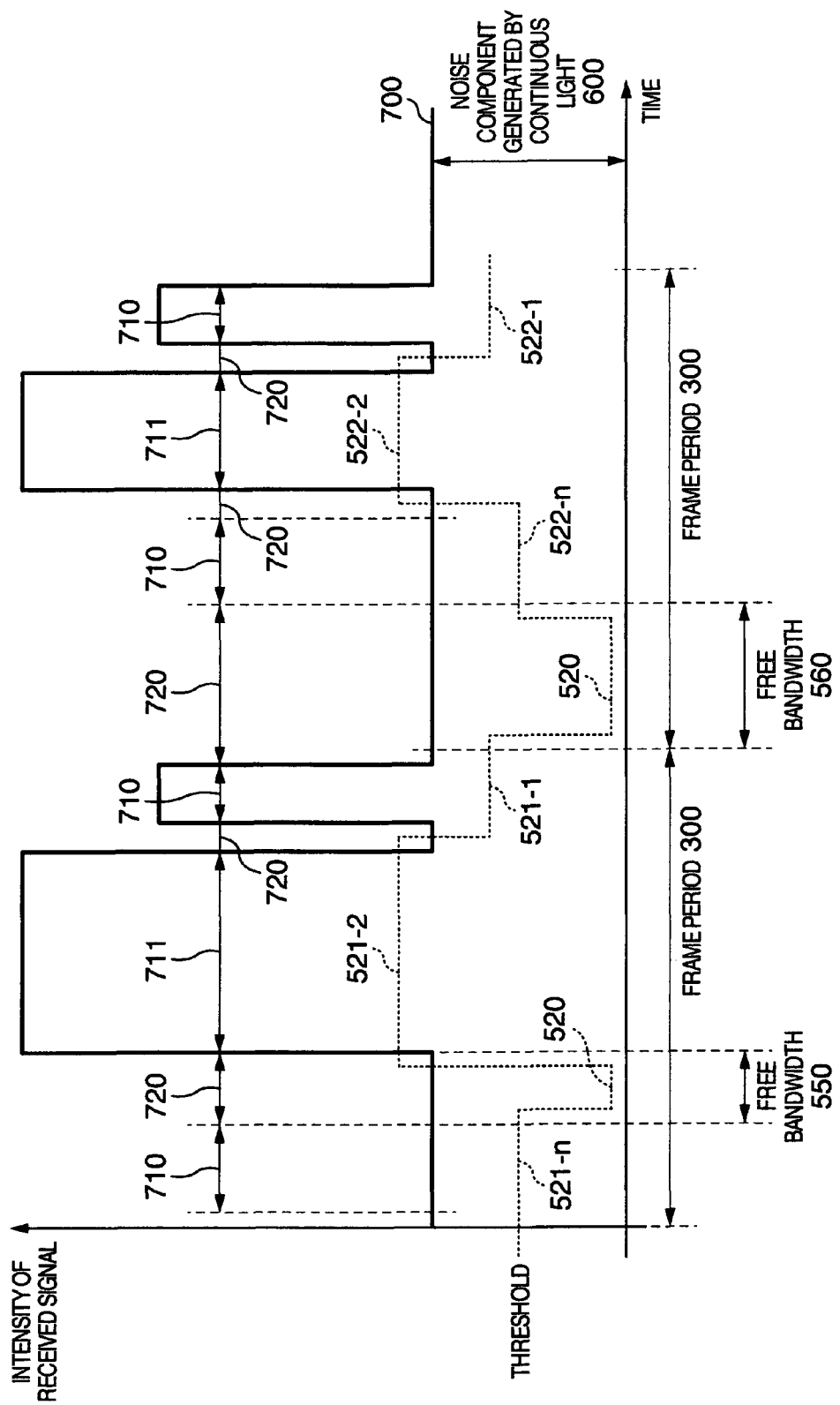
FIG. 4 is a signal configuration diagram (2) showing the uplink signals received by the OLT.

FIG. 4 is also a signal configuration diagram showing the uplink signals received by the OLT 10. FIG. 4 shows a state in which an abnormal condition is generated in the ONU 20-n connected below the OLT 10 and the optical signal is continuously output. As in FIG. 3, FIG. 4 shows that the uplink signals that have passed through the splitter 30 are time-division optically multiplexed onto the trunk optical fiber 100.

As shown in the figure, the intensity of all optical signals received by the OLT 10 appears increased by the intensity of an optical signal 600 continuously output by the ONU 20-n. This optical signal 600, which is different from a normal optical signal, is sometimes referred to as a noise component 600 in the description below.

To determine the reception of an optical signal, the OLT 10 compares the pre-stored thresholds 521 and 522 or the noise level 520 with the intensity of the actually received optical signal at the time the signal is received from each ONU 20 determined by DBA or at the no-light time in a free bandwidth and, if the signal intensity exceeds the threshold, assumes that some signal is received as described above. In this case, when a light with an intensity crossing the threshold 521 or 522 is detected at the GEM packet reception time scheduled by the OLT 10 as in an uplink signal reception period, it is determined that the uplink signal has been received from the corresponding ONU 20-2 and the signal level can be determined to be 0 or 1. However, it is determined at other times that some optical signal is received because the intensity exceeds the threshold 521 or 522 but, even if an attempt is made to identify the signal at those times, it is impossible to normally reproduce the uplink GEM packet because the intensity of the received optical signals always exceeds the threshold and the signals are always considered to be 1. For example, in an uplink signal reception period 710, it is possible to determine that some optical signal is received because an optical signal having the intensity higher than the threshold 521 is detected but, as described above, it is impossible to obtain correct digital signals. Also, in a reception period 720 that is recognized by the OLT 10 as a free bandwidth, it is considered that some signal is received because an optical signal with the intensity higher than the noise level 520 is detected and, as a result, it is impossible to determine that there is actually no uplink signal.

As shown in FIG. 4, when a continuous optical signal is output from one of the ONUs 20, the optical signals observed by the OLT 10 have the following two characteristics: one is that the intensity of the light increases by the intensity of the noise component 600 in all sections and the other is that the intensity of the optical signal received from a failed ONU becomes equal to the maximum value of the intensity that is assumed for the ONU. That is, as shown in FIG. 4, the intensity at the signal reception time 710, at which the signal would be received from the ONU 20-n if the operation is normal, is observed approximately equal to the intensity of the signal in a no-light section 720, and the intensity at this time is approximately equal to the intensity assumed for the signal to be received from the ONU 20-n. The intensity of a signal received from other ONUs 20 is the sum of the intensity assume for that signal and the intensity of the noise component 600.

The OLT 10 of the present invention makes use of the characteristics of the PON described above to detect an abnormality in the optical signal in the OLT 10. In addition, when an abnormality is detected, the OLT 10 changes the threshold as necessary for detecting a position (ONU 20 or branch optical fiber 110) where the intensity of an optical signal is abnormal. The following describes more in detail an embodiment of the configuration of the OLT of the present invention, and the operation method (error detection method) of the PON system using the OLT, with reference to the drawings.

Figure 5:
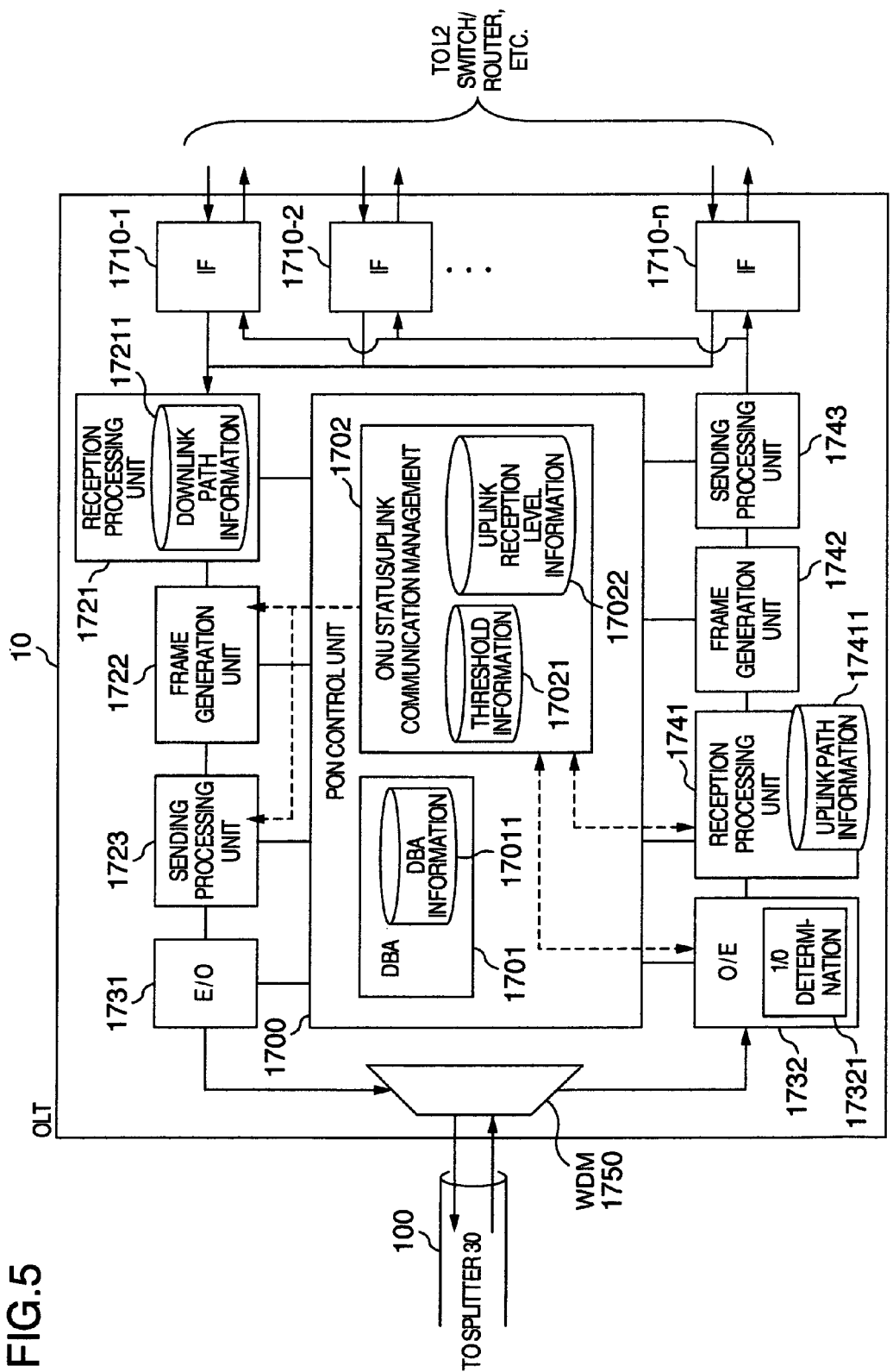
FIG. 5 is a block configuration diagram showing an example of the configuration of the OLT.

FIG. 5 is a block configuration diagram showing an example of the configuration of the OLT.

The OLT 10 of the present invention comprises one or more packet network interfaces (sometimes referred to as SNIs (Service Network Interface: hereinafter called SNI) in the description below) 1710-1-1710-n as the network interface for connection to the access network 1000. The 10/100M-1 G bps Ethernet protocol is used for the packet transmission protocol. This SNI is connected to layer-2 switches and routers, not shown, for sending and receiving packets. Note that not only a packet network interface but also a line switched network, such as E1 or T1 described above, may also be used as the SNI. The following describes the configuration and the operation of the OLT 10 for the downlink communication and those for the uplink communication.

Data sent to a subscriber (ONU 20) of the PON system is input to one of the SNIs 1710-1-1710-n via the access network 1000. The received data is transferred to a reception processing unit 1721 where the packet header information is analyzed. More specifically, the transfer destination ONU 20 of the received packet is determined based on the flow identification information including the destination information, sending source information, and path information included in the packet header. When the destination is determined, the header information included in the received packet is converted, or some information is added to it, as necessary. The operation described above is performed by referencing a downlink path information database (DB) 17211 provided in the reception processing unit 1721. In this DB 17211, data is stored for determining the packet processing that is based on one or more parameters included in the header information of the received packet. A frame generation unit 1722 changes the format of the received frame to the format of a frame that will be transmitted in the PON section 2000 according to the header processing content determined by the reception processing unit 1721.

When the Ethernet protocol is used for GPON, the DB 17211 is searched for to decide the VLAN tag processing (conversion, deletion, transparency, assignment) and its transfer destination for the received Ethernet frame. The frame generation unit 1722 generates a GEM header including Port-ID that is set in the transfer destination ONU 20 and sends the frame with the generated GEM header added to the received packet. That is, the Ethernet frame is encapsulated as a GEM frame.

A sending processing unit 1723 performs the procedure for sending the GEM frame generated by the frame generation unit 1722. This procedure includes the queuing processing based on the frame processing priority, the read processing, and the generation and sending processing for a downlink frame that is sent in the PON section. In the case of GPON, the downlink frame sending period occurs every 125µ seconds, and a downlink frame header, which includes a fixed pattern for use by the ONU 20 to capture a downlink frame in synchronization with the sending period, is added to the downlink frame at the start of the period (downlink frame). This frame header is followed by a combination of multiple GEM frames to form a downlink frame. The downlink frame received from the sending processing unit 1723 is converted from the electrical signal to the optical signal by an E/O 1731 and is sent to the ONUs 20-1-ONU 20-*n* via a wavelength division multiplexer (WDM) 1750 and the trunk optical fiber 100.

Data received from a PON system subscriber (ONU 20) is processed in the reverse order of the downlink signal processing described above. In PON, the uplink signals are sent from the ONUs 20-1-20-*n* at the times specified by the OLT 10 and are time-division optically multiplexed onto the trunk optical fiber 100. That is, the optical signals from the ONUs 20-1-20-*n* are burst packets sent from each ONU 20 intermittently.

The optical signal, received from the trunk optical fiber 100 via the WDM 1750, is converted from the optical signal to the electrical signal by an O/E 1732 based on the preamble added to the start of each received burst signal (GEM packet) and the pattern called a delimiter. And, the clock synchronization of the converted electrical signal is established and the signal value is determined (identified between 0 and 1). The signal value is determined by a 1/0 determination unit 17321 based on the threshold, and the digital data composed of two values, 0 and 1, is output.

Next, a reception processing unit 1741 recognizes the start position of the received GEM packet based on the frame synchronization of the digital data. This frame start position can be recognized by referencing a DBA information database (DB) 17011 provided in a PON control unit 1700 of the OLT 10. That is, because the sending time information specified by DBA is set in advance in the DB 17011, the reception processing unit 1741 compares this value with the actually recognized start position to check if the GEM packet has been received at the time specified by DBA. If the start position does not match the estimated value as a result of the recognition, the reception processing unit 1741 notifies the PON control unit 1700 that they do not match and adjusts the amount of data delay occurred in the ONU 20. In addition, the reception processing unit 1741 analyzes the header information on the GEM packet to determine the content of processing for the header of the packet and its transfer destination. At this time, the transfer destination is determined by referencing an uplink path information database (DB) 17411 in the same way the transfer destination of the downlink signal is determined by referencing the downlink path information DB 17211 as described above.

A frame generation unit 1742 converts the GEM packet, processed by the reception processing unit 1741, to the format according to the packet transfer protocol (for example, Ethernet protocol) and transfers the converted GEM packet to a sending processing unit 1743. Note that, in some cases, the frame generation unit 1742 configures a new packet under control of the PON control unit 1700 and transfers the configured packet to the sending processing unit 1743. When the Ethernet protocol is used for GPON, the DB 17411 is searched and the GEM packet is disassembled for producing an Ethernet packet. The sending processing unit 1743 performs the same processing as that of the downlink sending processing unit 1723 and sends the data, which has been read, to the access network 1000 via one of SNIs 1710-1-1710-*n*.

The PON control unit 1700, which manages and controls the OLT 10 and the whole PON system, has the ONU management function via OMCI and the PON section communication timing control function via DBA as described above. In the OLT shown in FIG. 5, a DBA control section 1701 controls and manages the PON section communication timing via DBA, and the ONU status/uplink communication management unit (hereinafter referred to as ONU management unit) 1702 performs the startup processing for the ONUs 20-1-20-*n* and manages the uplink signal reception status. Of course, if the functional operation described below can be implemented, the configuration other than this function-division configuration may also be used.

Based on the bandwidth allocation requests (sending-wait data amount declarations) from the ONUs 20 and the contract defined in advance when the user subscribed to the PON system, the DBA control section 1701 allocates bandwidths by dynamically giving data sending permission to the ONUs. The information on the bandwidth allocation result (sending start time, allowable data amount, sending end time, etc.) is notified to the ONUs 20 for use in the actual control operations and, at the same time, stored in the DBA information database (DB) 17011 for use in confirming the actual status of the signals received from the ONUs 20 or in the PON control (error detection, etc.) of the present invention that will be described later. The ONU management unit 1702, which controls and manages the status of the ONUs 20, among other things, the sending status of the signals to the OLT, manages the status of the signals (intensity of received signals) from the ONUs 20 and the information (thresholds, etc.) necessary for signal reception. A reception level information database (DB) 17022, a database that manages and stores the communication status of uplink signals from the ONUs 20-1-20-*n*, records the intensity values of uplink received signals detected by the reception processing unit 1741 as well as the information on the uplink signals from the ONUs 20-1-20-*n* used for the control operation that will be described later. A threshold information DB 17021 stores the thresholds 521 and 522 and the noise levels 520, required for identifying if the received signal is 0 or 1, for the ONUs 20-1-20-*n* and the DBA result. The thresholds and the noise levels are calculated using ATC and stored when the ONUs are started as described above or are stored in advance by the maintenance engineer.

FIG. 6 is a memory configuration diagram showing an example of parameters stored in the PON control unit 1700 for use in the control operation that will be described later. More specifically, the figure shows an example of the configuration of the bandwidth allocation information used for the error detection operation that is executed later and the intensity information management information on the uplink signals (received signals). Although the figure shows the configuration in a tabular format for describing the information in a summarized, easy-to-understand way, the table (memory) need not be physically prepared in the actual device (PON control unit in the OLT). It is only required to read or write necessary information using the information stored in the DBs described above.

The control information is composed of an uplink bandwidth allocation information group (hereinafter called a DBA table) 1210 periodically created and updated by DBA and an uplink received light monitor information group (hereinafter called an uplink received light monitor information table) 1220 created and updated according to the status of signals received from each ONU.

For example, in the case of GPON, the DBA table 1210 stores a sending start position 1212 and a sending end position 1213 of signals for each Alloc-ID (Allocation ID) 1211, which is the basic unit of DBA, using times and the number of bytes. The table also includes a flag 1214 that indicates whether the entry identified by each Alloc-ID 1211 is effective. This flag will be described later more in detail. Note that multiple Alloc-IDs 1211 may be allocated to each ONU 20. The ONU 20, which receives a bandwidth instruction, generates an uplink GEM packet for each Alloc-ID 1211 and sends the generated GEM packet. On the other hand, the uplink received light monitor information table 1220 records an ONU-ID 1221 that identifies the ONU 20 to which the Alloc-ID 1211 is assigned and, for each ONU 20, the received-signal intensity that is estimated when the next GEM packet is received. This intensity is estimated by referring to the initialization value or the intensity of the received signal obtained from the immediately preceding normal uplink GEM packet (optical signal). In addition, the uplink received light monitor information table 1220 also includes a flag 1223 that indicates the auxiliary information such as the received-signal status (normal or abnormal) of each Alloc-ID 1211 or each ONU-ID 1221 or the effectiveness of the entry.

If synchronization is not established for uplink GEM frames, the OLT 10 of the present invention notifies the PON control unit 1700 that the reception processing unit 1741 cannot detect signals. Failure to establish synchronization is due to multiple reasons, for example, the 1/0 determination unit 17321 finds a difference in the received signal intensity or the reception processing unit 1741 finds a difference in the reception times. The PON control unit 1700 collects the information on the uplink signal reception status, detected in multiple positions, once into the ONU management unit 1702 and, as will be described below, uses this information to keep track of the status of the ONUs 20 or to perform processing for abnormal continuous optical lights that are detected. For example, the PON control unit 1700 outputs an LOF (Loss of Frame) warning according to the judgment of the ONU management unit 1702 and, in addition, updates the uplink reception level information DB 17022 to decide an action for the ONU 20 according to the reception status.

Figure 7:
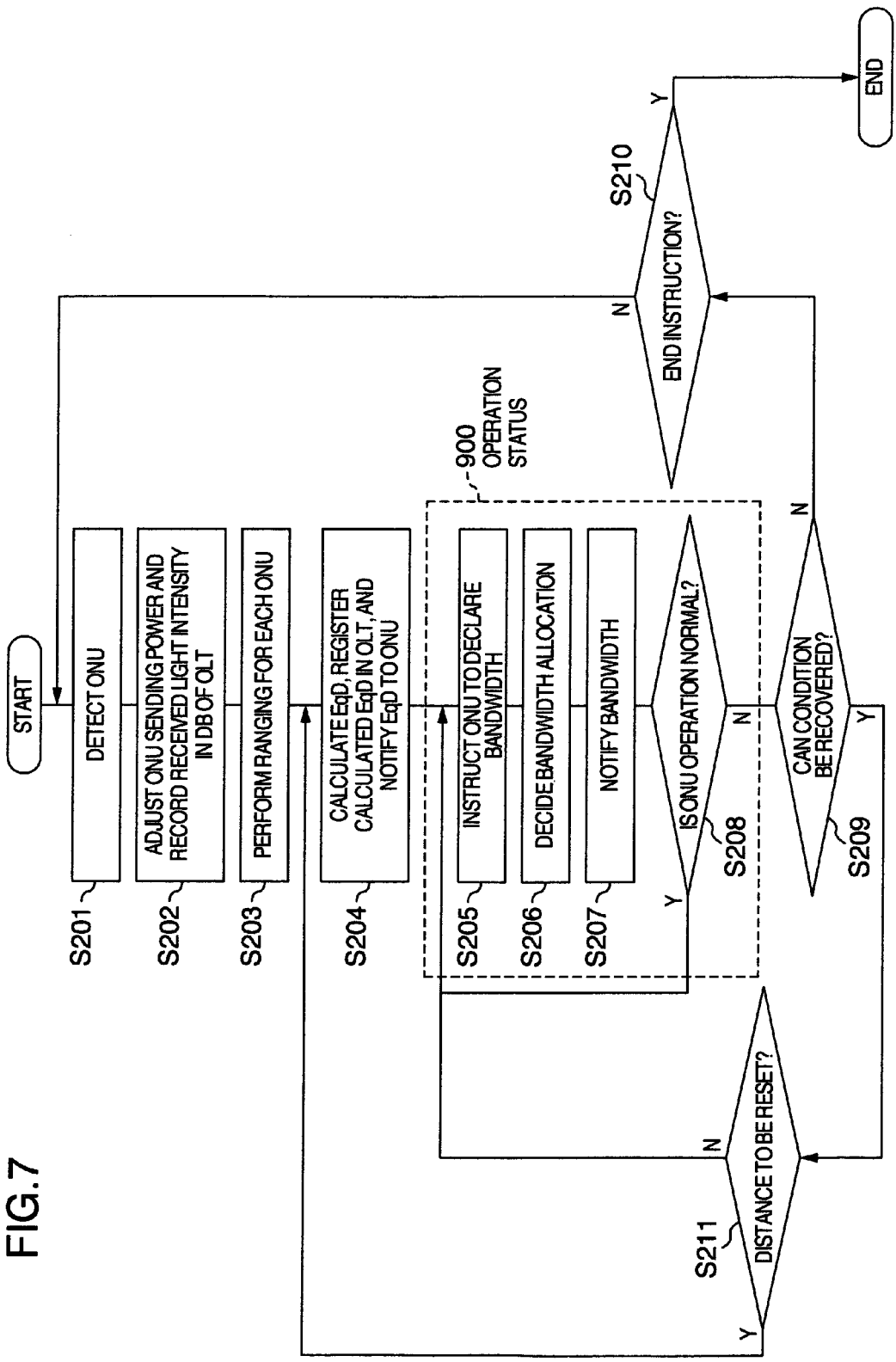
FIG. 7 is an operation flowchart (1) showing an example of the PON system operation.

FIG. 7 is an operation flowchart showing an example of the PON system operation. The figure shows an example of the operation processing that is performed when and after the OLT 10 starts the ONU 20 on GPON.

The ONU 20, when turned on, extracts a signal pattern included in a downlink signal received from the OLT 10, inserts the signal pattern into an uplink GEM packet, and sends the GEM packet to the OLT 10. Note that, as long as there is an ONU 20 that will be connected in future, the OLT 10 reserves time slots for the new ONU 20 to send uplink signals (not shown).

When a signal is received from the ONU 20 in the time slot and the signal includes a particular signal pattern specified in the downlink frame, the OLT 10 detects that a new ONU 20 is correctly connected (S201).

The OLT 10 measures the intensity of the optical signal received from the ONU 20 and, if necessary, instructs the ONU 20 to adjust the intensity of the uplink signal. When the intensity of the uplink signal (intensity of the signal received by OLT 10) of the ONU 20 is decided, the OLT 10 records this value and the threshold obtained via ATC in the DB 17022 (or storage area 1222 in FIG. 6) or in the DB 17021 provided in the OLT 10 (S202).

Next, the OLT 10 uses the ranging technique to measure the distance to the ONU 20 (S203), calculates an Equalization Delay (hereinafter called EqD), sets it in the ONU 20, and adjusts the base time (unified logical distance) of the response time of the ONU 20 so that it becomes equal to the base time of the already-connected ONUs. More specifically, the OLT 10 notifies the ONU 20 of EqD to allow the ONU 20 to adjust the signal output time thereafter according to the notified value (S204). At this time, the newly connected ONU 20 enters an operation state 900.

In the operation state 900, the OLT 10 first instructs the ONUs 20 to declare required bandwidths (S205) and decides, via DBA, the bandwidths to be allocated based on the bandwidth requests from each of the ONUs 20 (S206). After deciding the bandwidths, the OLT 10 notifies each ONU 20 about the bandwidth information and stores the bandwidth information in the DB 17011 (or storage area of the table 1210 in FIG. 6) (S207). The sequence of processing described above, including the issuance of an uplink bandwidth request, DBA processing, and notification to the ONU, is repeated cyclically. Based on the DBA processing in each period, the OLT 10 compares the optical signal, received from the ONU 20, with the value stored in the DBs 17011, 17021, and 17022, and confirms the reception time and the reception intensity (S208).

If an abnormal condition is detected in step S208, several conditions may occur, for example, the intensity of the signal received from the ONU 20 is decreased suddenly or the signal itself cannot be received. This condition is caused by one of several factors. If this condition occurs, the OLT 10 first determines the cause and checks if the communication status can be recovered (S209). If there is a possibility that communication status will be restored, the OLT 10 checks if the communication status will be recovered within a predetermined time or, if the system is configured as a redundant system, switches the system to a standby system. After the communication is recovered, control is passed to S204 to adjust the distance again if it is required to correct the sending time of the ONU 20, or to step S205 to repeat the processing from that step if it is not required to correct the sending time (S211).

If the communication status will not be recovered within the predetermined time and if an operation end request is received from the ONU 20 itself or an operation end instruction is received from the administrator, the operation is terminated in step S210. If there is a need to continue the operation, the processing must be re-executed from step S201 to restart the ONU 20.

Figure 8:
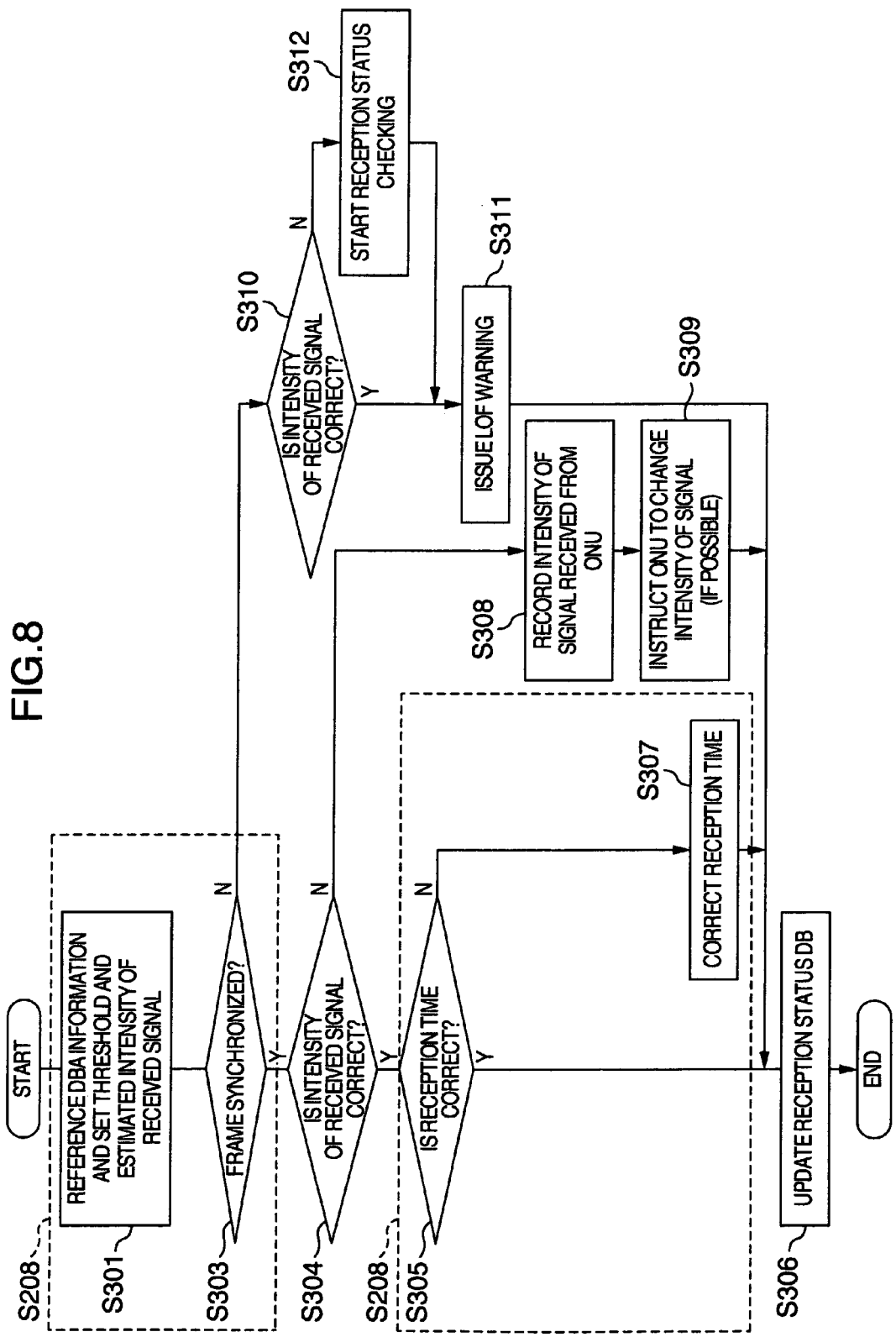
FIG. 8 is an operation flowchart (2) showing an example of the PON system operation.

FIG. 8 is also an operation flowchart showing an example of the PON system operation. The figure shows the detailed operation of the ONU operation checking step S208 in FIG. 7.

The figure shows an example of the PON error detection operation executed by the OLT 10 of the present invention. The parts enclosed by the dotted lines in the figure correspond to step S208 in FIG. 7.

Based on the result of DBA, the OLT 10 sets the threshold (FIG. 3: 520, 521, 522), which will be used by the 1/0 determination unit 17321 of the O/E 1732 to identify the received signal, in synchronization with the time at which the uplink signal is received from each of the ONU 20-1-20-$n$ (S301). More specifically, the threshold stored in the threshold information DB 17021 is set at the time stored in the DBA information DB 17011. In addition, in step S301, the intensity stored in the uplink reception level information DB 17022 in advance is read for later comparison with the intensity of a signal that will be actually received. After setting the threshold, the OLT 10 checks if the received signal can be frame synchronized during the processing of the reception processing unit 1741 (S303). If the received signal can be frame synchronized, the optical signal is considered to be normally recognized. On the other hand, if the received signal cannot be frame synchronized, the possible causes are that the received optical signal has an abnormal intensity or its reception time is incorrect. So, the procedure that will be described later is used to check the intensity of the received optical signal at this point in time (S310). If the intensity of the received signal is correct, the sending time of the ONU 20 must be corrected. An LOF warning is issued because the optical signal is correctly received but the optical signal cannot be frame synchronized (S311). If the intensity of the received signal is abnormal, it is judged that the intensity of the signal sent from the ONU 20 is lost for some reason (or, a light such as a continuous light shown in FIG. 4 is received and its intensity exceeds the maximum intensity that can be received by a reception apparatus), and the procedure that will be described later is used to check the reception status (S312). After that, an LOF is output because the signal is not frame synchronized (S311).

The intensity of the received signal is measured for managing the communication status though there is no problem with the communication with the ONU when the signal can be frame synchronized (S304). If the difference between the intensity of the received signal and the estimated value referenced in step S301 is equal to or larger than a predetermined value, the intensity of the received signal is recorded in the DB 17022 (or storage area 1222 in FIG. 6) (S308). In addition, because the communication with the ONU 20 is possible, the OLT 10 notifies the ONU 20 to change the sending power of the ONU 20 if the system is configured in such a way that the intensity of the signal output from the ONU 20 can be controlled by the OLT 10 (S309). Step S308 may be executed to record the intensity of the received signal each time the check is made including when the intensity is not abnormal.

If the signal can be frame synchronized and the intensity is correct, the reception time of the uplink signal is checked (S305). If the time is not the time specified by the OLT 10, there is a possibility that the EqD value that is set in the ONU becomes incorrect because of the expansion or contraction of the optical fiber. In this case, the correction value is notified to the ONU 20 or the ranging processing is re-executed (S307).

Finally, in the DBs 17011, 17021, and 17022 in which the status information on the ONU is stored, the data required to be updated is updated to complete the processing (S306). The data items required to be updated are communication status monitor information including the parameters specifying the intensity and the time of the received signal, the communication time, and the flag indicating whether the uplink frame was received successfully. More specifically, the data required to be updated is as follows: EqD for each ONU 20, the time at which the signal was sent from the OLT 10 or the reception time estimated by OLT 10 (items stored in 1210 in FIG. 6), the time at which actually received uplink frame was received, the estimated intensity of reception optical signal, the intensity of the actually received signal, the time at which the frame was received, and whether or not the communication was successful.

Figure 9:
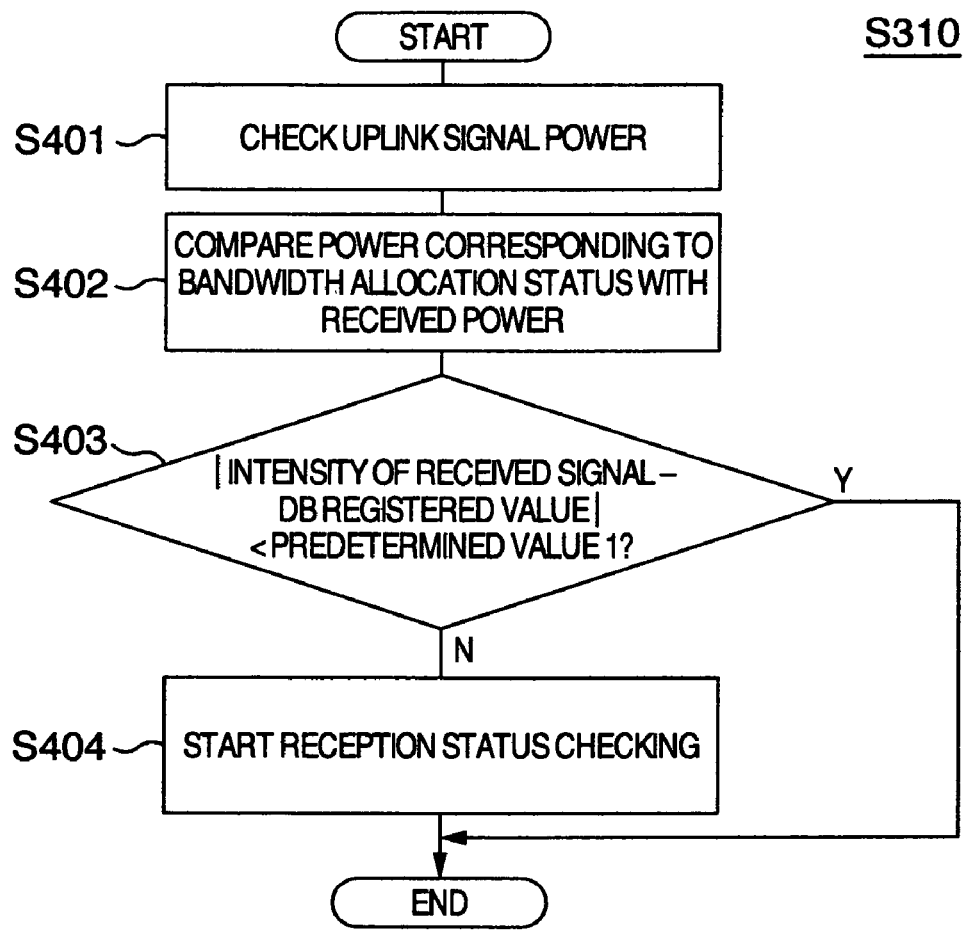
FIG. 9 is an operation flowchart (3) showing an example of the PON system operation.

FIG. 9 is also an operation flowchart showing an example of the PON system operation. The figure shows the detailed operation of step S310 in FIG. 8 in which the intensity of the received signal is checked.

First, the intensity of the received uplink signal is measured (S401). The estimated intensity value of the signal to be received, which has been acquired from the DB 17022 (or 1222 in FIG. 6) in step S301 in FIG. 8 and which is related to the bandwidth allocation information, is compared with the intensity measured in S401 (S402) to check if the difference between the intensity of the frame and the registered value (estimated value) is within a predetermined range (S403). If the difference is within the predetermined range, it is judged that the received light is normal and the processing is terminated (control is passed to Y in S310 in FIG. 8 and the processing is continued). If it is found that the difference between the measured intensity value and the estimated intensity value is equal to or larger than a predetermined value, control is passed to step S404 (S312 in FIG. 8) for checking the reception status in detail.

Figure 10:
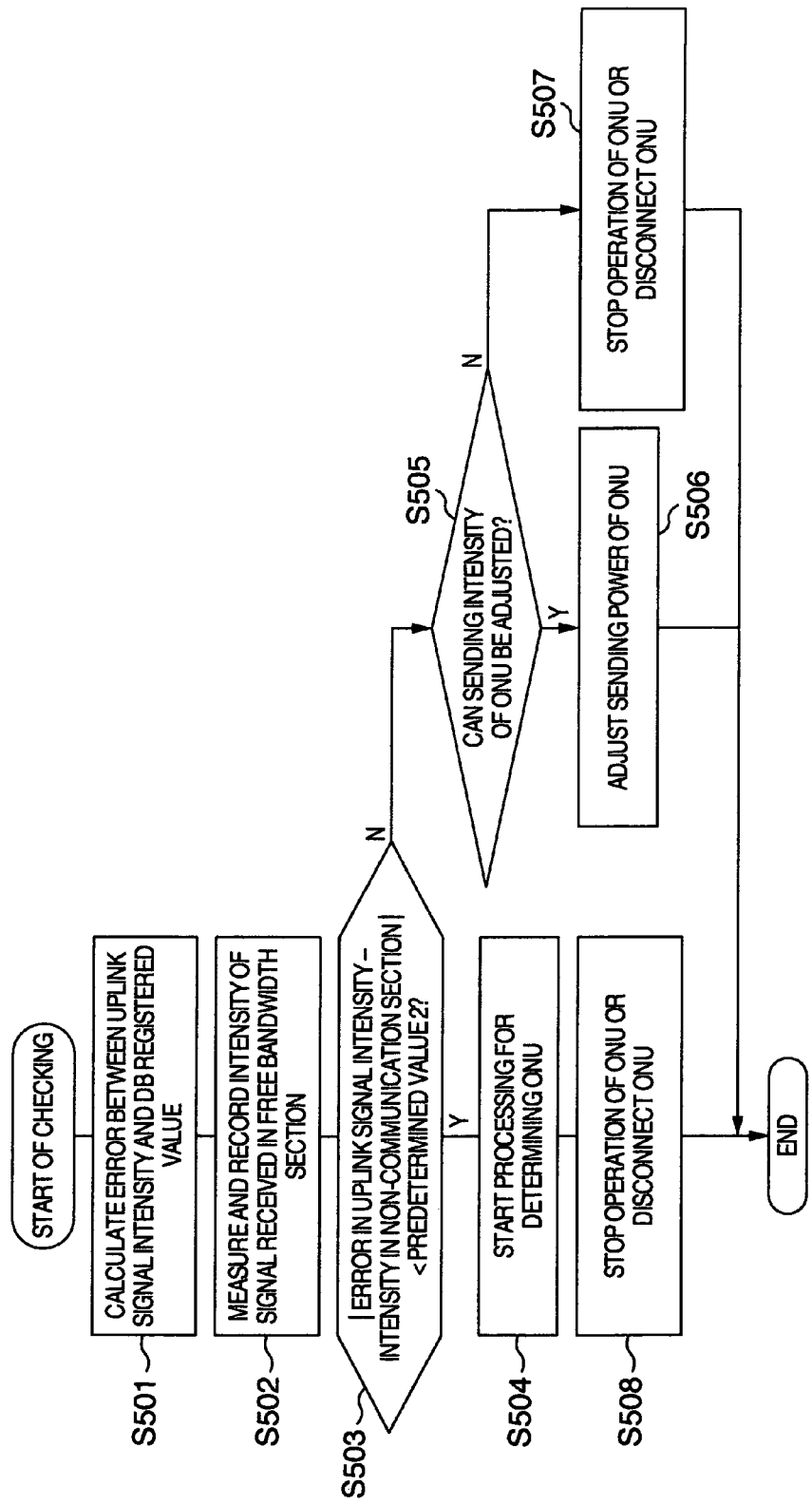
FIG. 10 is an operation flowchart (4) showing an example of the PON system operation.

FIG. 10 is also an operation flowchart showing an example of the PON system operation. The figure shows the detailed operation of the reception status checking step in S312 in FIG. 8 or step S404 in FIG. 9.

If the difference between the intensity of the actually received signal and the estimated value is equal to or larger than the predetermined value, it is judged that the intensity of the received signal is abnormal and, in this case, the difference between the intensity of the actually measured uplink signal and the registered value stored in the DB 17022 and so on is calculated (S501). This difference is an error in intensity from the value registered in the database.

Next, from the DBA information stored in the DB 17011 and so on, a no-light-state assumed time where no uplink signal is received is selected (for example, a position where the bandwidth is free, a position where uplink communication is inhibited in order to perform the ranging processing, or a position where the bandwidth is not allocated for uplink communication in order to detect an ONU 20 to be newly connected), and the intensity of the received signal at that time is measured. This value is temporarily stored somewhere in the OLT 10, for example, in a storage area of the uplink received light monitor information table 1220 shown in FIG. 6, for later analysis of error generation positions (S502). In the description below, the no-light state section described above is referred to as a non-communication section.

The difference between the actual intensity of the received signal measured in a non-communication section and the estimated intensity in the non-communication section (this intensity should be approximately 0) is calculated, and this intensity difference is compared with the error acquired in step S501 (S503). If the intensity difference measured in the non-communication section described above and the error in a communication section where communication is performed with an ONU are approximately equal (the difference between the both is smaller than a predetermined value), it is considered that an uplink continuous light is input for some reason or other in the PON section 2000. In this case, the processing is started for determining an ONU 20 that outputs the continuous light or a branch optical fiber 110 from which the continuous light is input to the trunk optical fiber 100 (S504). If the ONU 20 or the branch optical fiber 110 is determined in this step, the operation of the ONU is stopped or the branch optical fiber is disconnected and the operation of the whole system is checked (S508).

On the other hand, if the difference between the error in the received light intensity in the communication section of an ONU 20 and the error in the received light intensity in the non-communication section is equal to or larger than the predetermined value, it is considered that the ONU 20 has failed or an error occurs in the branch optical fiber to which the ONU is connected. In this case, an executable action is taken for this condition in the following step (S505). First, a message, which indicates the adjustment of the sending power, is sent to the ONU 20 to check if the intensity of the signal sent from the ONU 20 can be changed. If the ONU 20 can change the intensity, a message requesting the ONU 20 to change the intensity setting of the output signal is sent to adjust the intensity of the received signal (S506). Of course, the adjusted intensity is stored in the DB 17022 and so on. If the intensity setting of the ONU cannot be changed in step S505, the operation of the ONU is stopped or the branch optical fiber is disconnected and the operation of the whole system is checked (S507). Examples of this case include not only a case in which a continuous light is input intentionally but also a case in which the optical module of the ONU has failed or a case in which the intensity adjustment function is not provided in the ONU.

Figure 11:
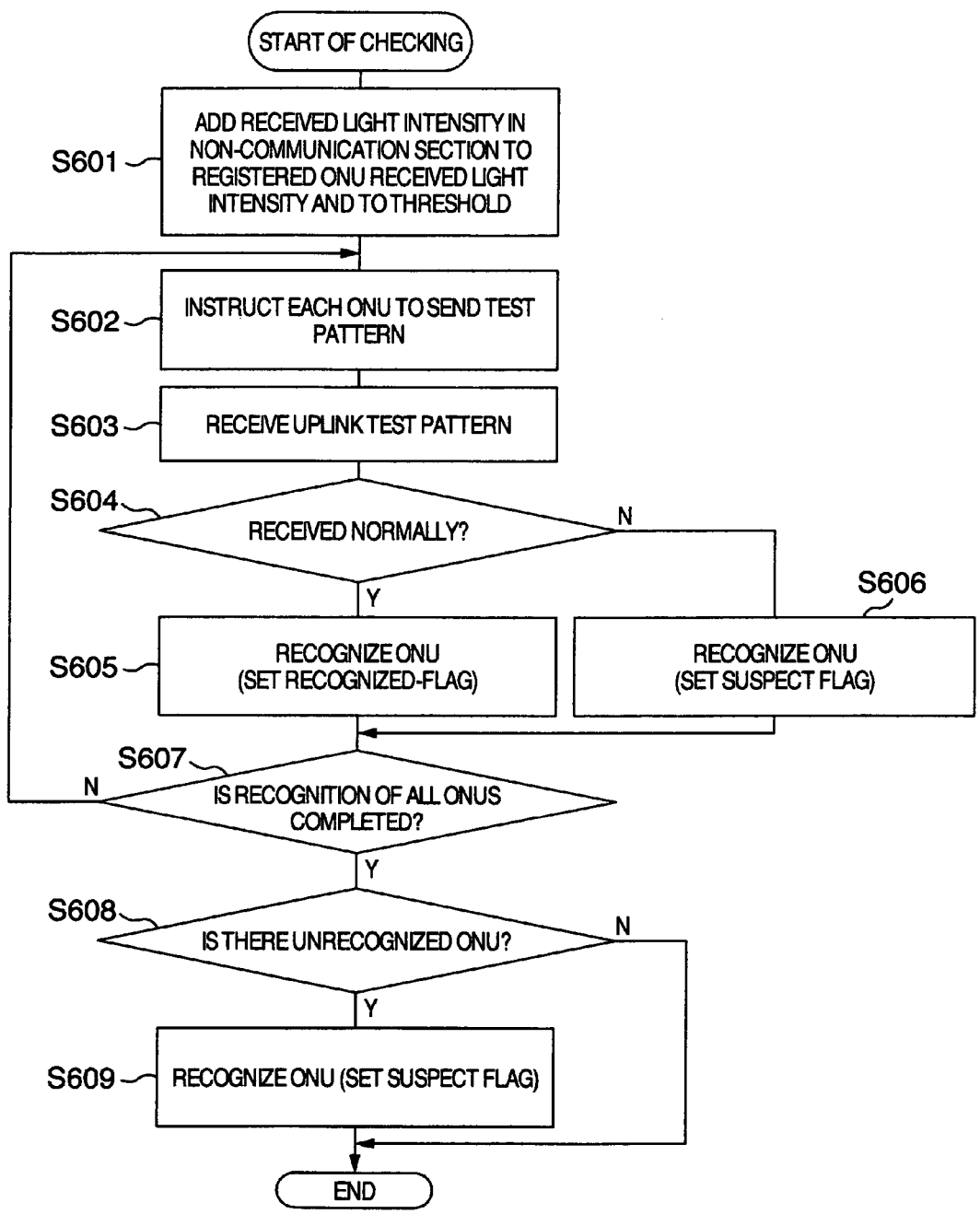
FIG. 11 is an operation flowchart (5) showing an example of the PON system operation.

FIG. 11 is also an operation flowchart showing an example of the PON system operation. The figure shows the detailed operation of the ONU determination processing step in S504 in FIG. 10.

If it is found in S503 in FIG. 10 that an uplink continuous light is input in the PON section 2000 for some reason or other, it is considered that a continuous light is sent because of an error in a particular ONU 20 or a continuous light is input intentionally on a branch optical fiber 110. In this situation, the OLT 10 sometimes cannot control the ONU 20. So, if the abnormal condition described above is detected, the PON or the OLT 10 of the present invention determines, via the OLT 10, the controllable ONUs 20 that are in normal operation and judges that a remaining, uncontrollable ONU 20, or the branch optical fiber 110 connected to the ONU, has failed.

The intensity value of the received signal in the non-communication section, which was measured and stored in S502 in FIG. 10, is read and is added to the value of the intensity of the signal received from each ONU 20 registered (stored) in the DB 17022 and so on and to the threshold registered (stored) in the DB 17021 for receiving the signal from each ONU 20. That is, the continuous light component, measured when the abnormal condition occurred, is added to the intensity of the signal received from each registered ONU 20 (S601).

An instruction is sent to each of the ONUs 20-1-20-n to request it to send a test pattern (S602). This test pattern is sent for confirming the intensity and the time of the received signal in order to check if each of the ONUs 20-1-20-n outputs the signal correctly according to the instruction from the OLT 10. Note that this test pattern may be any pattern determined in advance in the PON system for individually identifying each of the ONUs. For example, a message used for the ranging processing may be used (In GPON, PLOAM message including the ONU-ID).

The OLT 10 receives the test pattern form the ONU 20 (S603) and checks if the test pattern, which is sent according to the instruction, is received normally. The reception of this signal is checked in the same manner as the reception of the signal shown in FIG. 8 (S604). If the normal reception of the signal from an ONU 20 is recognized, the normality-recognized flag corresponding to the ONU 20 is set (S605). More specifically, the area 1223 where the flags are stored is provided in the control parameter storage area, such as the one shown in FIG. 6, and the flags in that area are set. If the normal reception is not recognized, it is suspected that a received-signal intensity error or a reception time error has occurred or that the OLT 10 cannot control the ONU and, in this case, the suspect flag corresponding to the ONU 20 is set (S606). The processing of S602-S606 is performed for all ONUs 20-1-20-n registered in the OLT 10 of the PON system (S607).

If it is found that, after the test of all ONUs, the suspect flag is set for an ONU20, there is a possibility that at least the operation of the ONU for which the flag is set is abnormal or an error occurred during the operation in the branch optical fiber 110 to which the ONU is connected or in the trunk optical fiber 100. So, as described in S508 in FIG. 10, it is necessary to stop the operation of the ONU or to disconnect the branch optical fiber. If there is no ONU 20 that is not yet checked, a continuous light is probably input in the uplink direction of the PON section 2000 by some abnormal means. In this case, it is necessary to check the branch optical fiber 110 to which an already-checked ONU 20 is not connected or to check if the trunk optical fiber 100 is abnormal (S609).

The processing described above allows the ONU 20, which may possibly have failed, to be isolated and, so, this processing is terminated and an action is taken for correcting the abnormal continuous light.

In the actual PON system operation, it is desirable to create a backup of the databases because the information registered in the uplink reception level information DB 17022 is temporarily changed according to an error situation. In addition, after the ONU 20 is determined or disconnected, it is necessary to check the information (for example, a change in non-communication section) on the ONU 20 whose operation was stopped and change the registered contents of the DBs 17011, 17021, and 17022 or to restore the information, registered in the uplink reception level information DB 17022, using the intensity information on the signals received in the free bandwidths 550 and 560.

Figure 12:
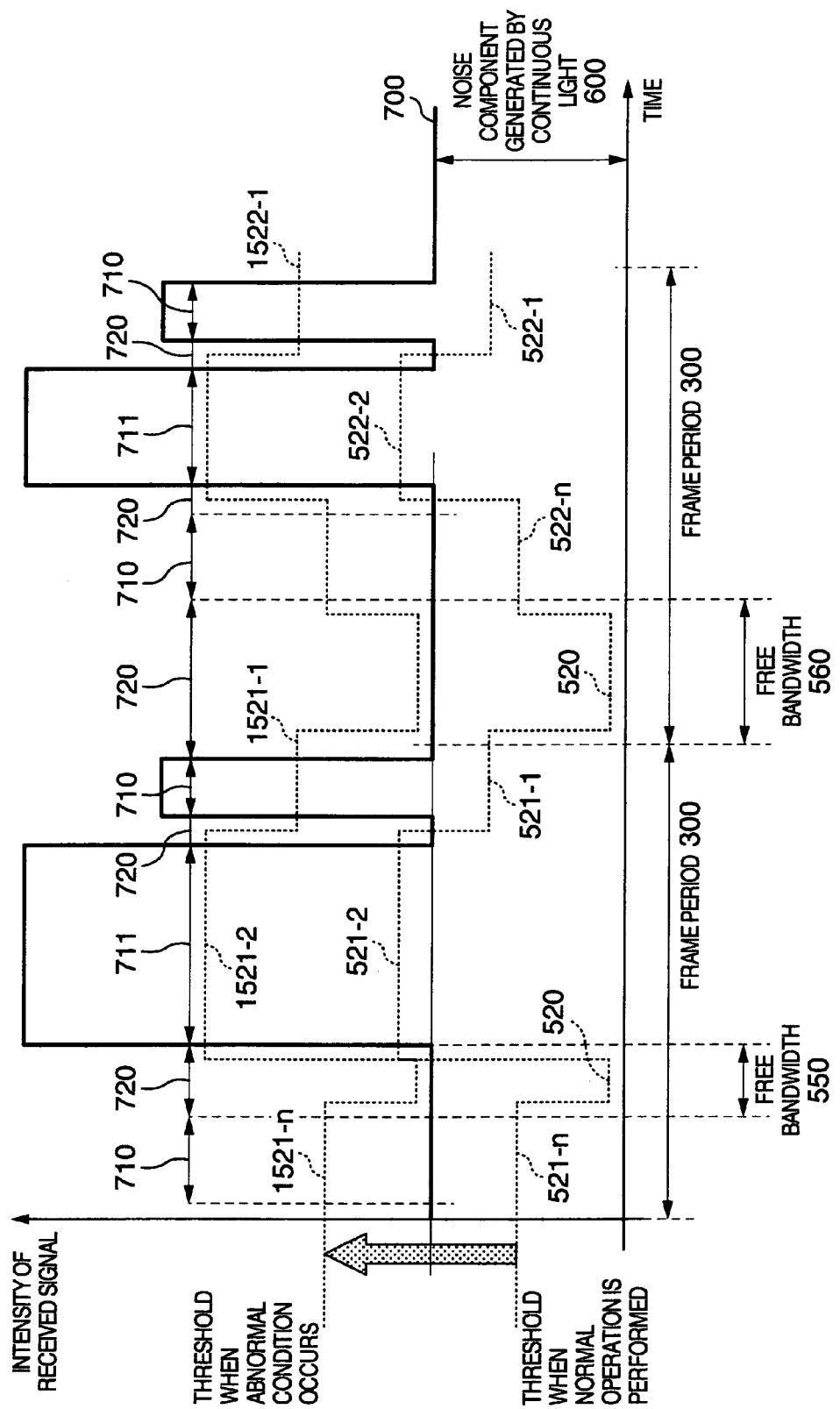
FIG. 12 is a signal configuration diagram (3) showing the uplink signals received by the OLT.

FIG. 12 is a signal configuration diagram showing the uplink signals received by the OLT 10. The figure shows that an abnormal condition occurred in the ONU 20-n connected below the OLT 10 and the optical signal is output continuously. This figure shows that, as in FIG. 3 and FIG. 4, the uplink signals pass through the splitter 30 and are time-division optically multiplexed onto the trunk optical fiber 100 and that the ONU determination processing shown in FIG. 11 is performed and, as a result, the continuous light component measured because of the generation of an abnormal condition is added to the signals that are actually received and to the thresholds to be set. In S604 in FIG. 11, the continuous light component is added to the thresholds 521 and 522 read from the DB 17021 and these new thresholds 1521 and 1522 are set in the 1/0 determination unit 17321 for use in checking if the received signals are normal. The figure shows that the normality checking of the signals received from the ONUs 20, which is performed in S604, gives the following result. That is, for the ONU 20-n that outputs the continuous light because a failure occurs, the threshold 1521-n is set and it is judged that the signal is not received normally (no-light/no-signal) but, for the ONU 20-1 and ONU 20-2 that are normal, the thresholds 1521-1 and 1521-2 are set and, even when the optical signal to which the continuous optical is added are received, the values 0 and 1 are identified normally and it is judged that the signals are received normally.

Figure 13:
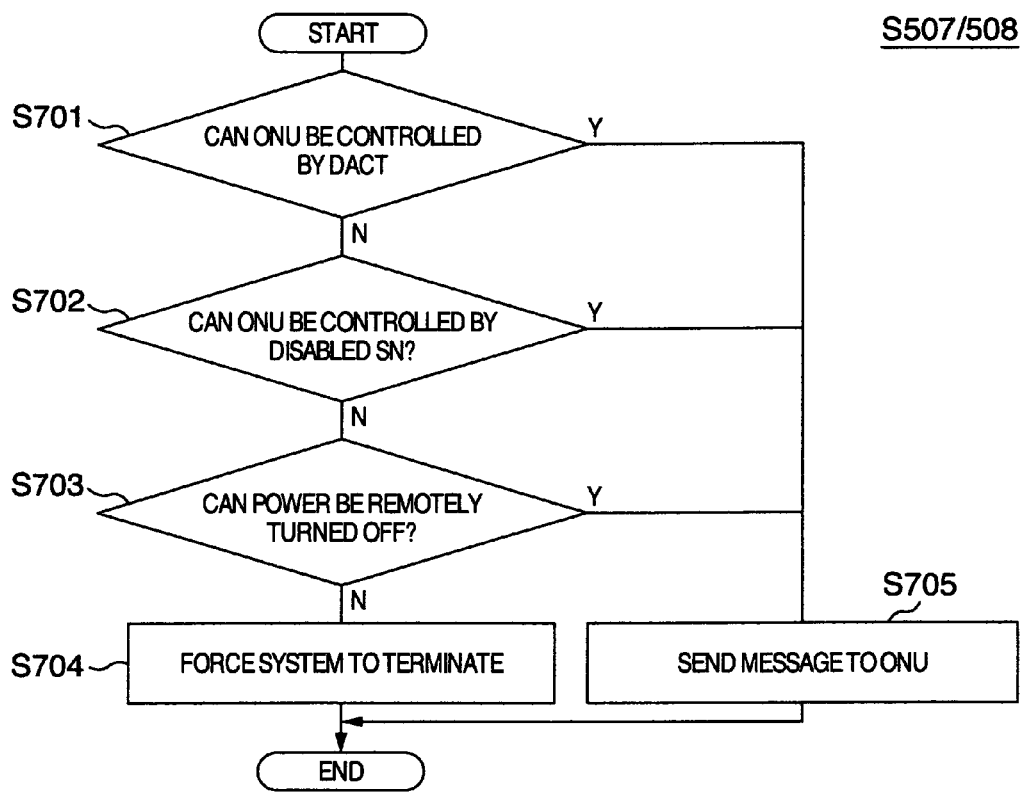
FIG. 13 is an operation flowchart (5) showing an example of the PON system operation.

FIG. 13 is also an operation flowchart showing an example of the PON system operation. The figure shows the detailed operation of the ONU operation stop processing step in S507 and S508 in FIG. 10.

The processing in FIG. 13 is applicable when the ONU 20, which is determined as failed, can respond to a control instruction from the OLT 10 but is not applicable to the ONU 20 when the ONU 20 is uncontrollable even if the OLT 10 performs the operation described below. For example, even if the sending optical module of the ONU is uncontrollable but the other part is operating normally, the uplink signal sent from the ONU can be stopped by the method described below.

If the ONU can be controlled by the DACT message from the OLT 10 (S701), the message is sent to the ONU 20 to stop the operation of the ONU 20 that is in abnormal operation. On the other hand, if the ONU cannot be controlled by the DACT message, the Disable SN (Serial number) message is sent as an alternative message that cancels the registration of the ONU 20 and disables the uplink bandwidth usage (S702). If the ONU can be controlled by the message, an uplink GEM packet is not sent from the ONU depending upon the configuration of the ONU 20 and, in this case, the ONU is in the same state as when the ONU is practically in the stopped state. On the other hand, if the ONU cannot be controlled by the message, another alternative method is used in which the power of the ONU 20 is turned off by the OLT 10 (S703). If this control cannot be performed either, the system is forced to stop (S704), for example, the ONU is manually deleted by visiting the site where the ONU 20 is installed.

Figure 14:
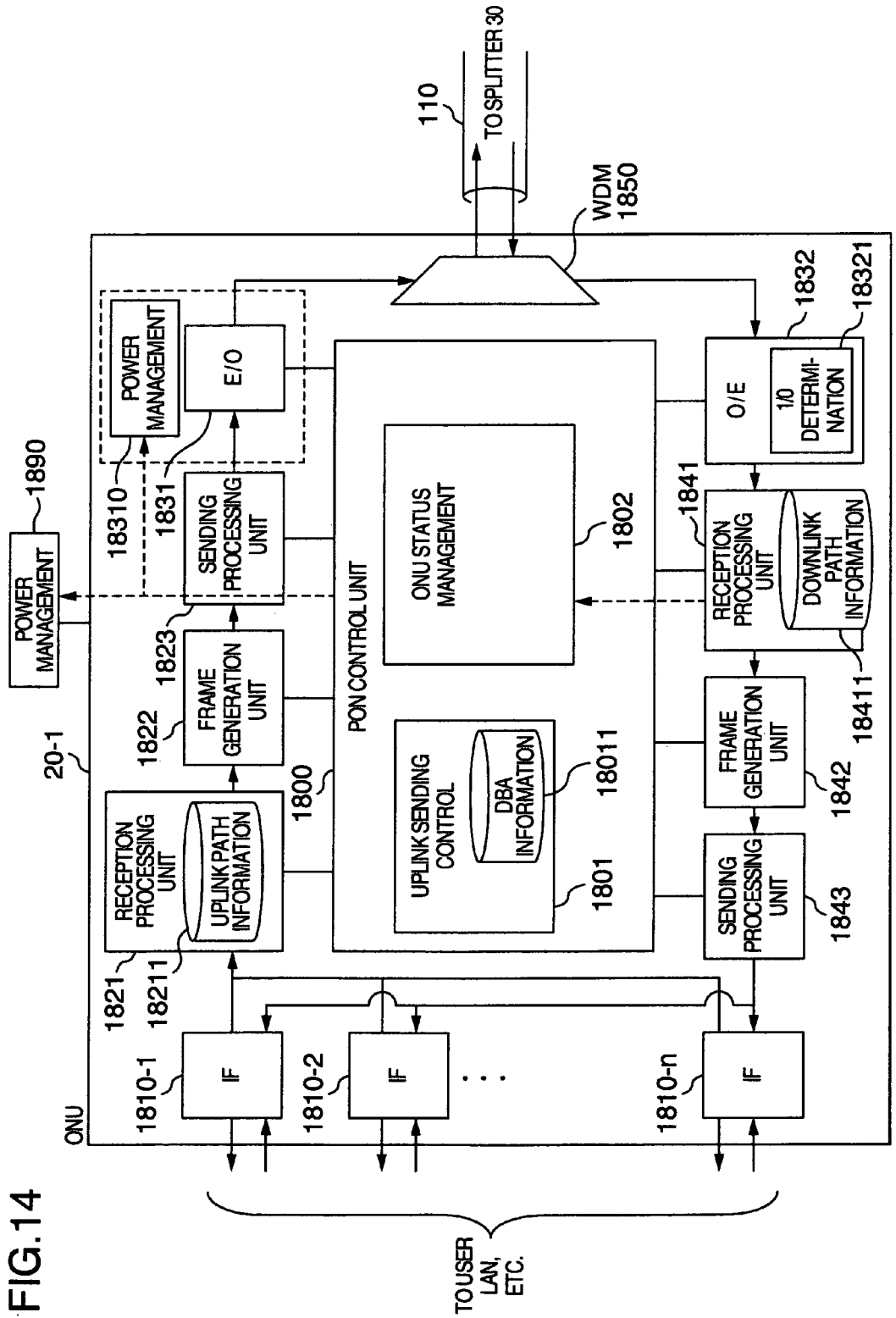
FIG. 14 is a block configuration diagram showing an example of the configuration of the ONU.

FIG. 14 is a block diagram showing an example of the configuration of the ONU 20.

Because the ONU 20 of the present invention performs the operation by interacting with the OLT 10 to configure the PON system, the configuration and the operation of the functional blocks provided for processing the data flow are approximately the same as those of the OLT 10 except the following two: first, as the user network interface (hereinafter referred to as a UNI) for connection to the user 50, one or more packet network interfaces (hereinafter, this interface is also sometimes referred to as an UNI) 1810-1-1810-n are provided instead of the SNIs 1710-1-1710-n of the OLT 10 and, second, the directions of the uplink signals/downlink signals are reversed. That is, an O/E 1832 that comprises a 0/1 determination unit 18321, a reception processing unit 1841 that comprises a downlink path information DB 18411, a frame generation unit 1842, and a sending processing unit 1843 are provided in the downlink direction, a reception processing unit 1821 that comprises an uplink path information DB 18211, a frame generation unit 1822, a sending processing unit 1823, and an E/O 1831 are provided in the uplink direction and, under control of a PON control unit 1800, data is sent and received to and from the OLT 10 via a WDM 1850 and the branch optical fiber 110. The PON control unit 1800, which manages and controls the ONU 20 under control from the OLT 10, comprises an uplink sending control unit 1801 that has a DBA information DB 18011 storing DBA results, produced by the OLT 10, and sends an uplink GEM packet based on the stored content and an ONU status management unit 1802 that stores and manages the ONU status. Because the basic configuration and the data processing method of this ONU 20 are approximately the same as those of the OLT 10 shown in FIG. 5, the detailed description is omitted here. The following describes the configuration and the operation for stopping the ONU when the OLT 10 determines that the uplink signal form the ONU is abnormal.

The ONU 20 has the function that changes the operation content according to various instructions, such as those described in FIG. 13, received from the OLT 10. More specifically, the ONU 20 comprises power management functions 1890, 18310, and so on, corresponding to the multiple functional blocks so that the DACT message, Disabled SN message, and remote power-off instruction can be processed.

A message or an instruction sent from the OLT 10, when received by the O/E 1832, is frame synchronized by the reception processing unit 1841 for analysis. If the message or the instruction specifies the operation stop or the disconnection of the ONU, the reception processing unit 1841 notifies the message or the instruction to the PON control unit 1800. In the PON control unit 1800, the ONU status management unit 1802 receives the instruction and processes it. In addition to the messages described above, the messages that must be notified to the PON control unit 1800 include the PON system control information issued by the OLT 10 such as the DBA information and ONU startup information.

The ONU 20, if controllable by the OLT 10, operates as follows. First, in response to the DACT message, the ONU status management unit 1802 instructs the optical module to stop sending the signals. More specifically, the ONU status management unit 1802 controls the power management unit 18310 and turns off the power supply of the E/O 1831 to stop the output of the uplink signals. If the ONU cannot be controlled by the DACT message, the ONU receives the Disable SN message next. If this message is received, the registration of the ONU 20 is canceled in the OLT 10 and, so, the ONU 20 cannot communicate with the OLT 10 thereafter. Thus, when this message is received, the ONU 20 suspends the sending of all signals. In addition, the ONU status management unit 1802 performs the operation to turn off the power of the optical module (E/O 1831). Furthermore, if the control operation described above cannot be performed successfully, an attempt is made to force the power of the whole ONU 20 to be turned off. More specifically, in response to a remote power control instruction, the ONU status management unit 1802 notifies the signal to the power management unit 1890, which controls the power of the whole ONU 20, to stop the whole ONU.

Figure 15:
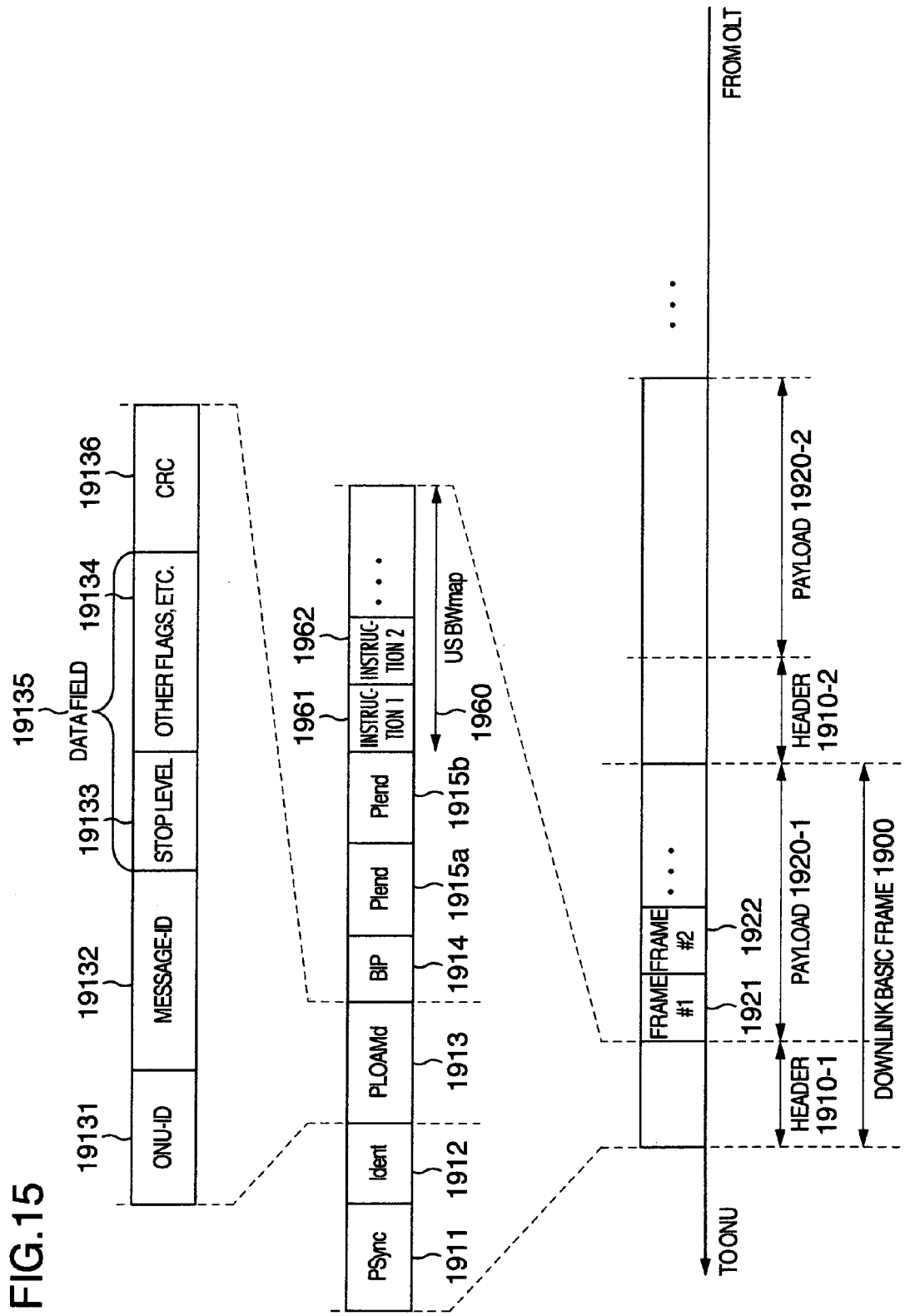
FIG. 15 is a signal configuration diagram showing an example of the configuration of the downlink signals (GEM frame) in the PON section.

FIG. 15 is a signal configuration diagram showing an example of the configuration of the downlink signal (GEM frame) in the PON section 2000.

The signal used on the PON system of the present invention, which is based on the configuration of the PLOAM frame defined for GPON, uses a header 1910 of a downlink frame received by all ONUs 20-1-20-n. A PLOAMd 1913 included in the header 1910 is a field used for controlling the startup of the ONU 20 (allocation of ONU-ID and Alloc-ID, etc.), the distance during the operation, and failure monitoring. In the PON system (OLT 10) of the present invention, the data fields of this PLOAMd 1913 are used for stopping the operation of the ONU 20 or for disconnecting the ONU 20 as described above. More specifically, the PLOAMd 1913 is composed of an ONU-ID 19131 indicating the destination ONU and a Message-ID 19132 indicating that the message is originally defined by the operator responsible for the PON system operation, followed by a data field 19135 composed of an identifier 19133 indicating a stop level to be executed by the ONU 20 and related control parameters (flags, etc.) 19134. The ONU checks this field 19135 and performs the operation described above to stop the ONU operation or disconnect itself. In the OLT 10, the ONU management unit 1702 provided in the PON control unit 1700 issues a DACT sending instruction, a Disabled SN message sending instruction, or a remote power-off sending instruction. In response to this instruction, the frame generation unit 1722 inserts the instruction in the data field 19135 of a downlink frame, and the sending processing unit 1723 reads the frame according to the assigned priority and sends the instruction to the PON section 2000.

Figure 16:
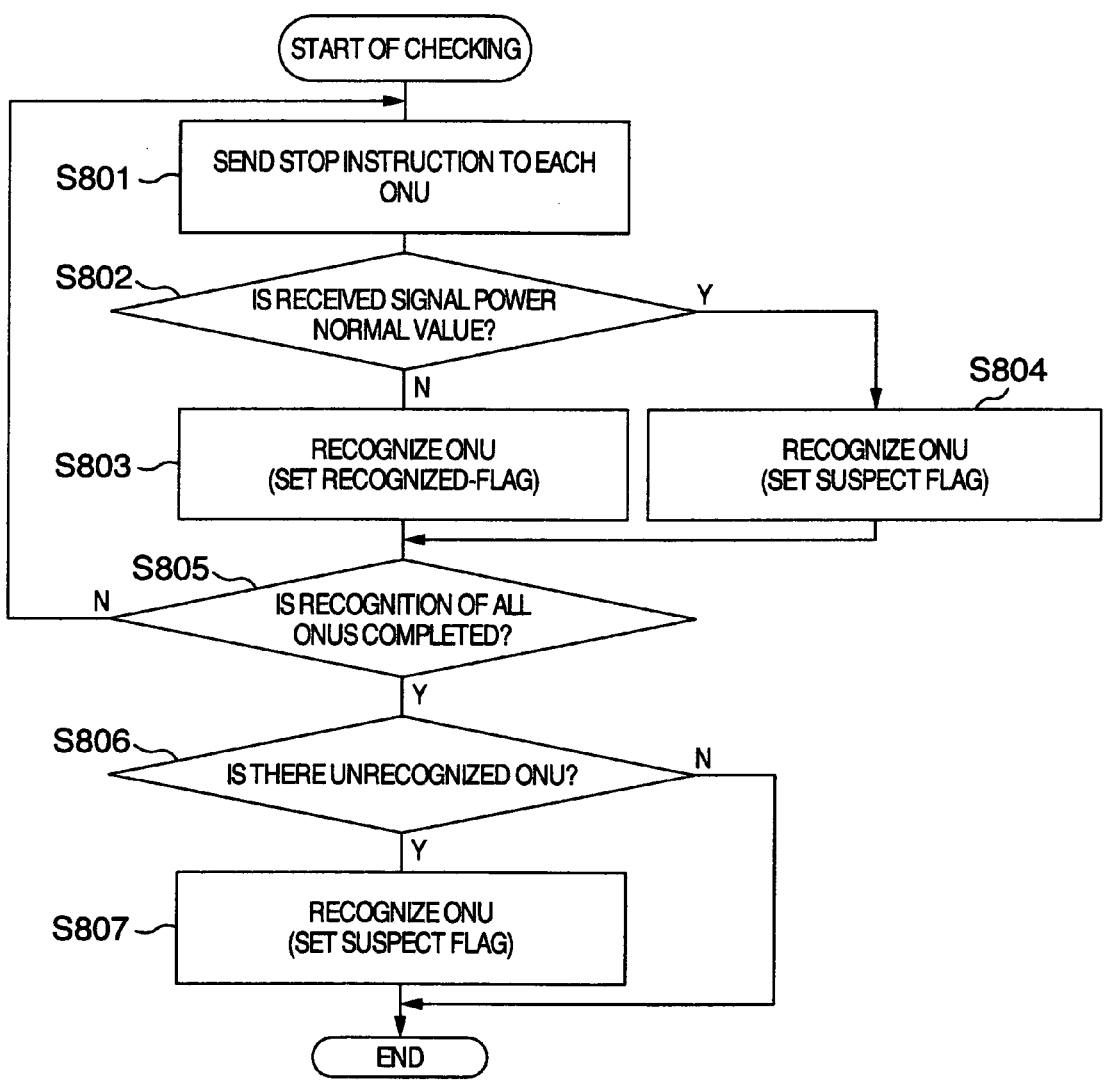
FIG. 16 is an operation flowchart (6) showing an example of the PON system operation.

FIG. 16 is also an operation flowchart showing an example of the PON system operation. The figure shows another control procedure used in the ONU determination processing step in S504 in FIG. 10.

This procedure shows a procedure for use when the ONU 20 can be controlled by the OLT 10 and the ONU 20 can be stopped as described in FIG. 13. More specifically, based on the ability to stop the operation of each ONU, the OLT 10 monitors the received light of the uplink signal when an abnormal condition is detected in the received signal while sequentially stopping the ONUs 20 registered in the OLT 10, one at a time, to determine the ONU 20 that is sending the continuous light.

First, an ONU 20 is selected and the operation stop instruction is sent (S801). This processing is executed by the procedure described in FIG. 13. The intensity of the received signal measured at the time in the non-communication section, which was already stored as described in the procedure in FIG. 10, is read and this value is compared with the intensity of the received signal to judge if the signal can be received normally (S802). If the intensity of the signal received from the ONU is continuously higher than the estimated value (the state in which the intensity of the signal received in the non-communication section is added to the stored value that is read), the ONU 20 does not probably fail and so the recognized flag is set for the ONU (S803). Conversely, if it is recognized that the intensity of the signal received in the non-communication section returns to the normal value, the ONU 20 probably fails and so the suspect flag is set for the ONU (S804). This sequence of processing is performed for all ONUs 20-1-20-*n* (S805). The subsequent operations S806 and S807 are the same as S608 and S609 of the procedure described in FIG. 11.

Figure 17:
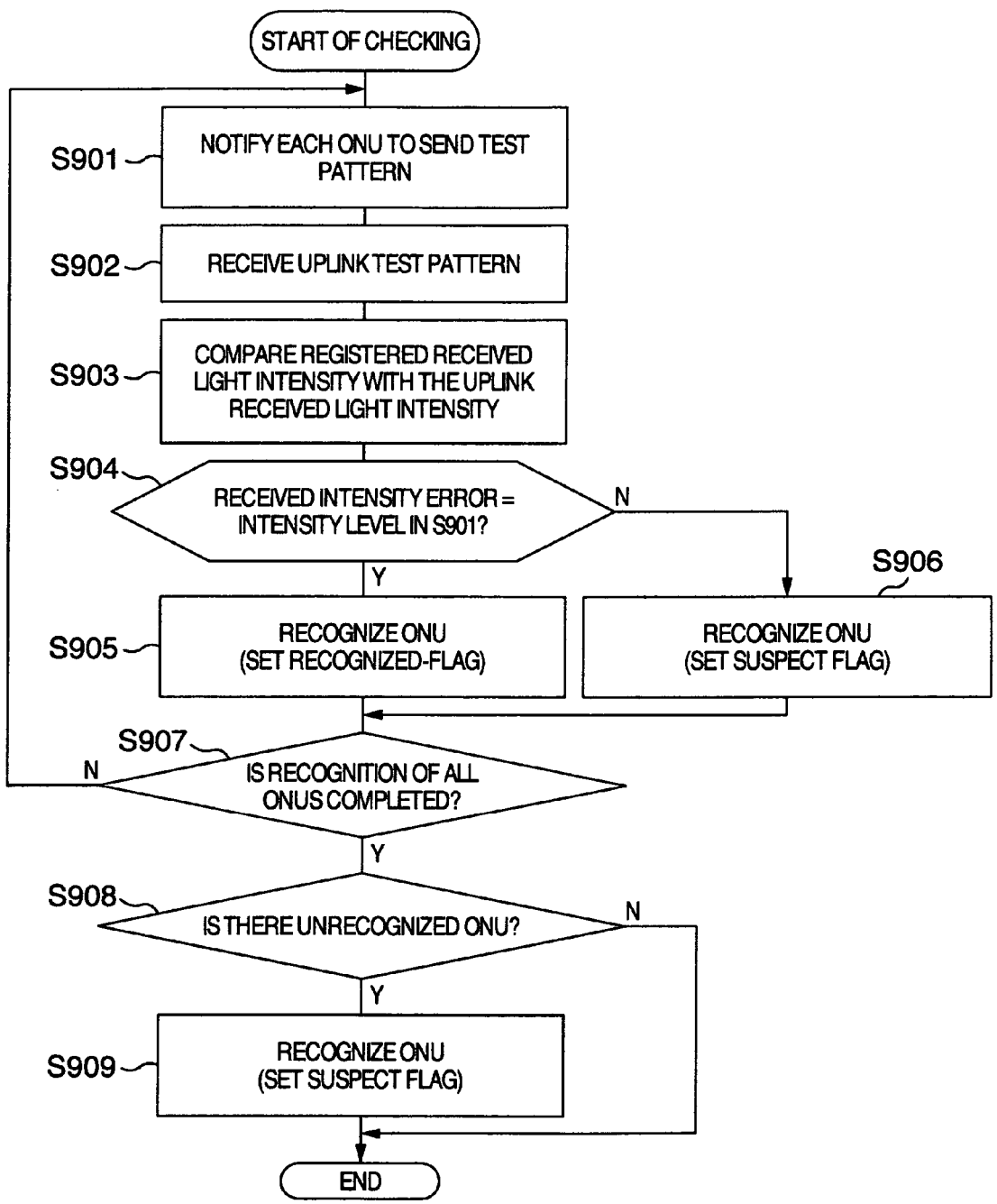
FIG. 17 is an operation flowchart (7) showing an example of the PON system operation.

FIG. 17 is also an operation flowchart showing an example of the PON system operation. The figure shows another control procedure used in the ONU determination processing step in S504 in FIG. 10.

First, an instruction is issued to each ONU 20 to request it to send a test pattern (S901) and, when the test pattern is received from the ONU 20, the intensity of the optical signal is measured when the test pattern is received (when the test pattern is assumed to be received) (S902). Because the intensity (estimated value) of the signal received from the ONU 20 is registered in the DB 17022 in advance, the measured intensity and the estimated value are compared to find the error (S903). If this error is approximately equal to the intensity measured at the time in the non-communication section which was already stored as described in the procedure in FIG. 10, it indicates that the signal from another ONU is added to the signal of the ONU 20 and the ONU 20 is determined to be normal and, in this case, the recognized-flag is set for the ONU (S905). Conversely, if the intensity of the received signal does not change from the assumed value before the failure detection, the ONU 20 is probably sending the continuous light and, in this case, the suspect flag is set for the ONU (S906). This sequence of processing is performed for all ONUs 20-1-20-*n* (S907). The subsequent operations S908 and S909 are the same as S608 and S609 of the procedure described in FIG. 11.

The PON system and the operation method of the present invention allow a failed ONU to be easily determined simply by adding a simple control procedure to the OLT and by changing the reception status of the OLT when the signal is received from a selected ONU. In addition, the failed ONU can be determined easily by controlling the operation status of the selected ONU. That is, when an ONU fails, the ONU can easily be determined simply by executing a simple control procedure in the OLT to disconnect the ONU from the PON system operation. Thus, the effect on the communication with other ONUs can be minimized. In addition, the PON system and the operation method of the present invention reduce the maintenance time of a maintenance engineer in charge of maintaining the PON system, resulting in a reduction in the system operation cost and an increase in the maintenance efficiency. When a continuous light is intentionally input to the PON system with an intention to disrupt the service, the PON system and the operation method of the present invention allow the user to quickly and easily determine the ONU and the light input position and to disconnect the ONU from the OLT, thus increasing the security and reliability of the system operation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A fault determination method for determining a fault occurred in a passive optical network system in which a parent station and a plurality of child stations are connected via an optical fiber network including an optical splitter and a plurality of optical fibers, comprising the parent station effecting operations of:

by a reception circuit, receiving an optical signal from each of said plurality of child stations using a threshold used to identify if the optical signal is 0 or 1;

by a bandwidth setting unit, determining a time at which each of said plurality of child stations sends an optical signal, and notifying the time to each of said plurality of child stations;

by a storage unit, storing the thresholds and intensities of optical signals received from said plurality of child stations;

by a control unit, setting a threshold, stored corresponding to the time, in said reception circuit to control a reception of an optical signal, by said control unit, when said system is in a normal state, storing a first intensity of an optical signal received from each of said plurality of child stations according to the determined time and a second intensity of the optical signal received at a time other than the determined time, and thresholds corresponding to said plurality of child stations, and by said control unit, when a fault occurs in a child station or in an optical fiber and said parent station detects an abnormal condition in a reception of optical signals from said plurality of child stations, performing a reception of an optical signal with the threshold, which is set in said reception circuit at a time at which a signal is received from each of said plurality of child stations, changed to a value generated by adding the second intensity to the stored threshold and, by said control unit, if a comparison between the first intensity and the intensity of the received signal indicates a normal reception, judging that the child station whose threshold is changed, is normal and by said control unit, determining a child station in which a fault occurs or the optical fiber connected to the child station by selecting a child station, which is not determined normal as a result of the change in the threshold, from said plurality of child stations.

2. The fault determination method according to claim 1 wherein said parent station also has a function to control optical signals sent by said plurality of child stations and, when the abnormal condition in a reception is detected, selects a child station and controls an intensity of the optical signal sent by said child station for determining a child station where the fault occurs or an optical fiber to which the child station where the fault occurs is connected.

3. The fault determination method according to claim 1 wherein the fault detected by said parent station is a fault involving an output of a continuous light.

* * * * *